United States Patent [19]
Danielson et al.

[11] Patent Number: 5,251,013
[45] Date of Patent: * Oct. 5, 1993

[54] VEHICLE STRAIGHTENER MEASURING UNIT, MEASURING APPARATUS RELIANT ON REFLECTED BEAM(S), AND SOURCE, TARGETS AND METHOD

[76] Inventors: Glen C. Danielson, 1619 Gretchen Ave., Grand Island, Nebr. 68803; Thomas M. Westhoff, 716 NW. 8th St., Willmar, Minn. 56201

[*] Notice: The portion of the term of this patent subsequent to Mar. 5, 2008 has been disclaimed.

[21] Appl. No.: 619,294

[22] Filed: Nov. 28, 1990

Related U.S. Application Data

[63] Continuation-in-part of Ser. No. 359,921, May 31, 1989, Pat. No. 4,997,283, which is a continuation-in-part of Ser. No. 329,010, Mar. 27, 1989, abandoned.

[51] Int. Cl.$^5$ .............................................. G01C 5/00
[52] U.S. Cl. .................................. 356/375; 356/400; 33/288
[58] Field of Search ................ 356/1, 4, 375, 400, 356/21; 33/288, 293; 72/705

[56] References Cited

U.S. PATENT DOCUMENTS

| | | |
|---|---|---|
| 4,047,025 | 8/1977 | Lemelson . |
| 4,110,610 | 8/1978 | Mueller et al. . |
| 4,492,471 | 1/1985 | Wiklund ............................ 356/375 |
| 4,701,615 | 10/1987 | Schmitt . |
| 4,731,936 | 3/1988 | Aldrich et al. ........................ 33/288 |
| 4,830,489 | 5/1989 | Cain et al. ............................ 356/375 |
| 4,922,623 | 5/1990 | Aldrich et al. ........................ 33/288 |
| 4,936,678 | 6/1990 | Gordon et al. ........................ 356/4 |
| 4,997,283 | 3/1991 | Danielson et al. .................... 356/375 |
| 5,029,397 | 7/1991 | Palombi ................................ 33/288 |

FOREIGN PATENT DOCUMENTS 1446463 12/1988 U.S.S.R. ............................. 356/152

*Primary Examiner*—Richard A. Rosenberger
*Attorney, Agent, or Firm*—Hovey, Williams, Timmons & Collins

[57] ABSTRACT

Apparatus and methods for determining the deformation of a vehicle body comprising coded targets including coded reflective surfaces positioned in predetermined locations relative to the vehicle body for indicating deformation of the body by determining the spatial position of the targets, a laser generating unit positioned for sweeping a laser beam across the reflective surfaces of the targets, a receiver for receiving the reflected beam, and computer-based, electronic equipment and logic responsive to the receiver for indicating the spatial position of the target means relative to a predetermined normal position with respect to the vehicle body. Apparatus also for determining two and three dimensional spatial coordinates of objects from each other and from a base, utilizing the foregoing components. Additional apparatus comprising portions of the foregoing.

18 Claims, 42 Drawing Sheets

Microfiche Appendix Included
(280 Microfiche, 4 Pages)

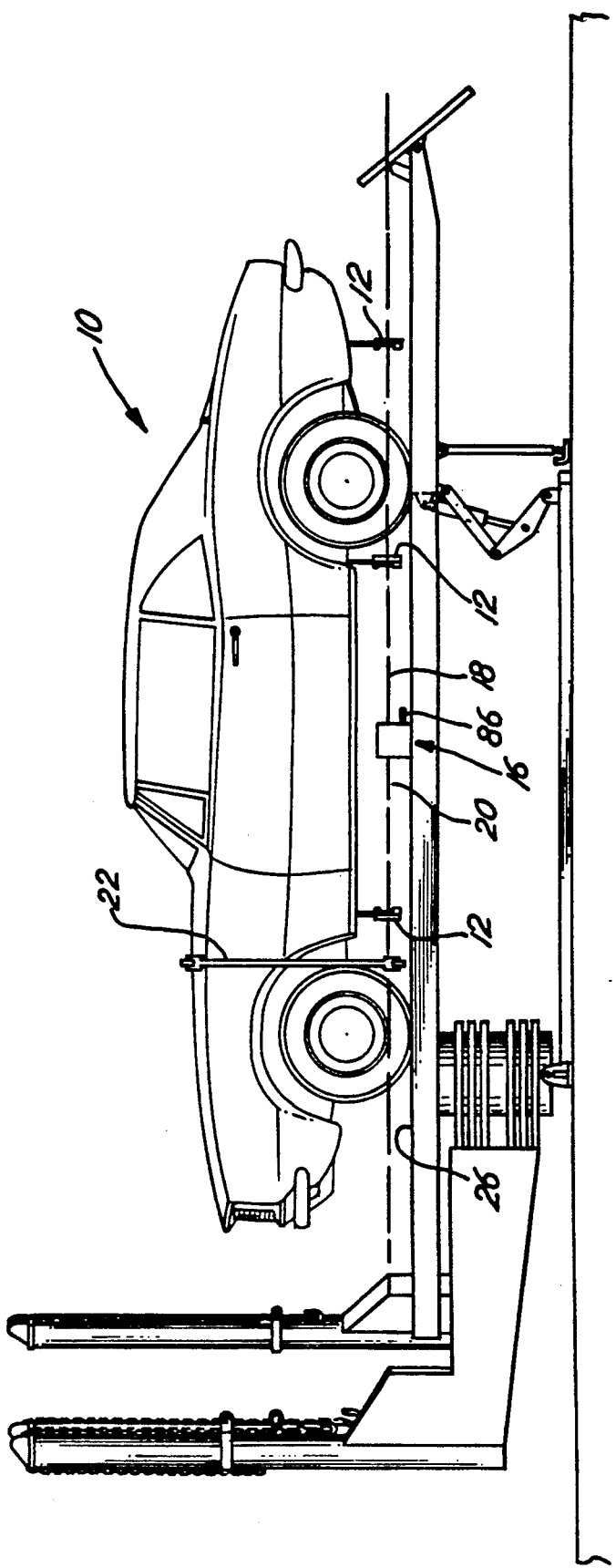

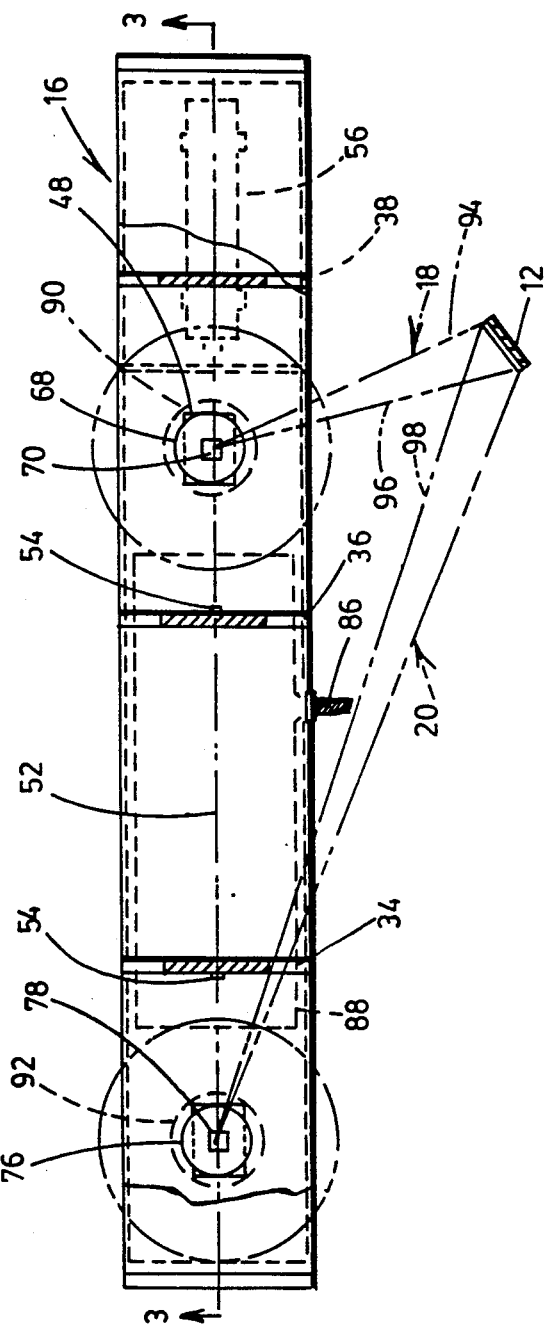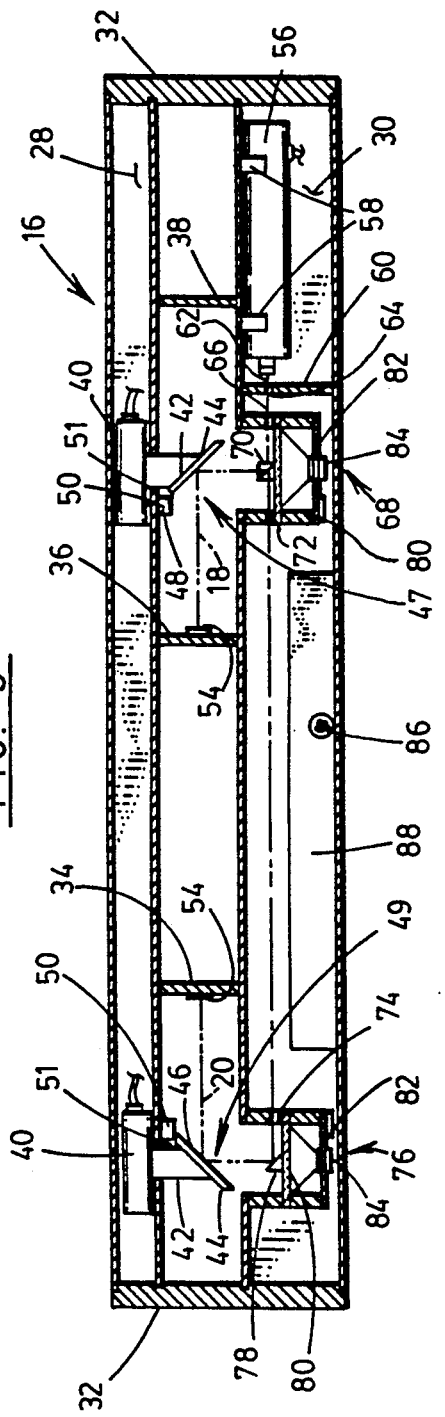

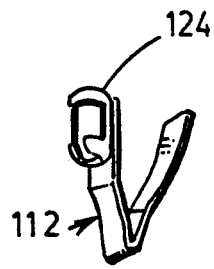
FIG. 7
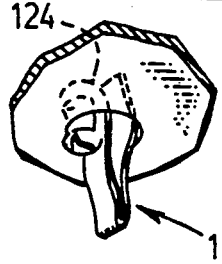
FIG. 8
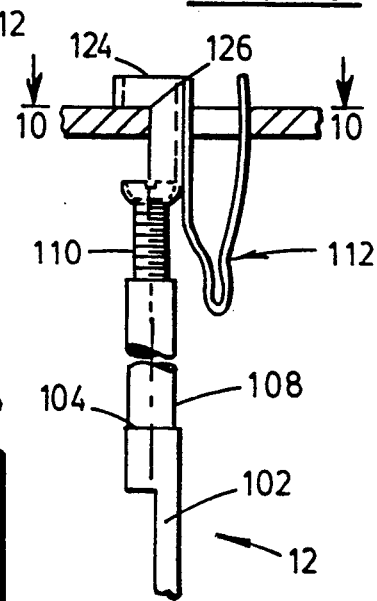
FIG. 9
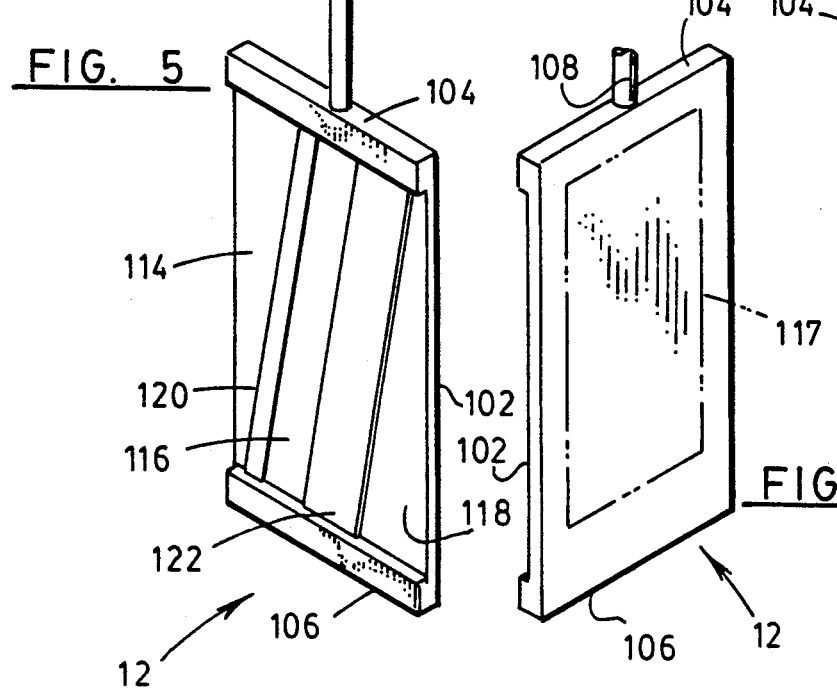
FIG. 5
FIG. 6

FIG. 14

| FIG.14a | FIG.14b | FIG.14c | FIG.14d | FIG.14e | FIG.14f | FIG.14g |
|---|---|---|---|---|---|---|
| FIG.14h | FIG.14i | FIG.14j | FIG.14k | FIG.14l | FIG.14m | FIG.14n |

FIG. 16

| FIG.16a |
|---|
| FIG.16b |
| FIG.16c |
| FIG.16d |
| FIG.16e |
| FIG.16f |
| FIG.16g |

FIG. 13

| FIG.13a | FIG.13b |
|---|---|

FIG. 15

| FIG.15a | FIG.15b |
|---|---|

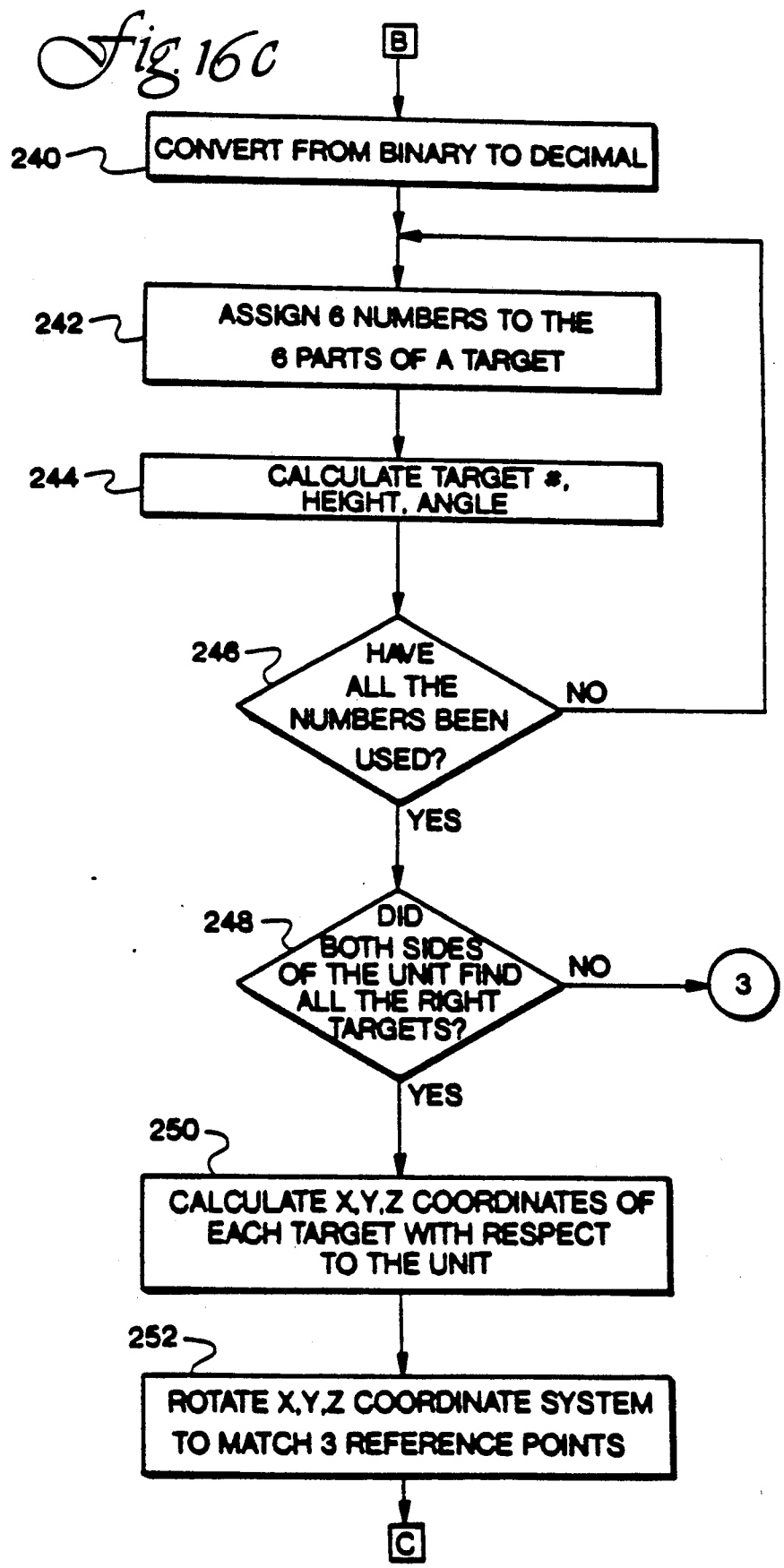

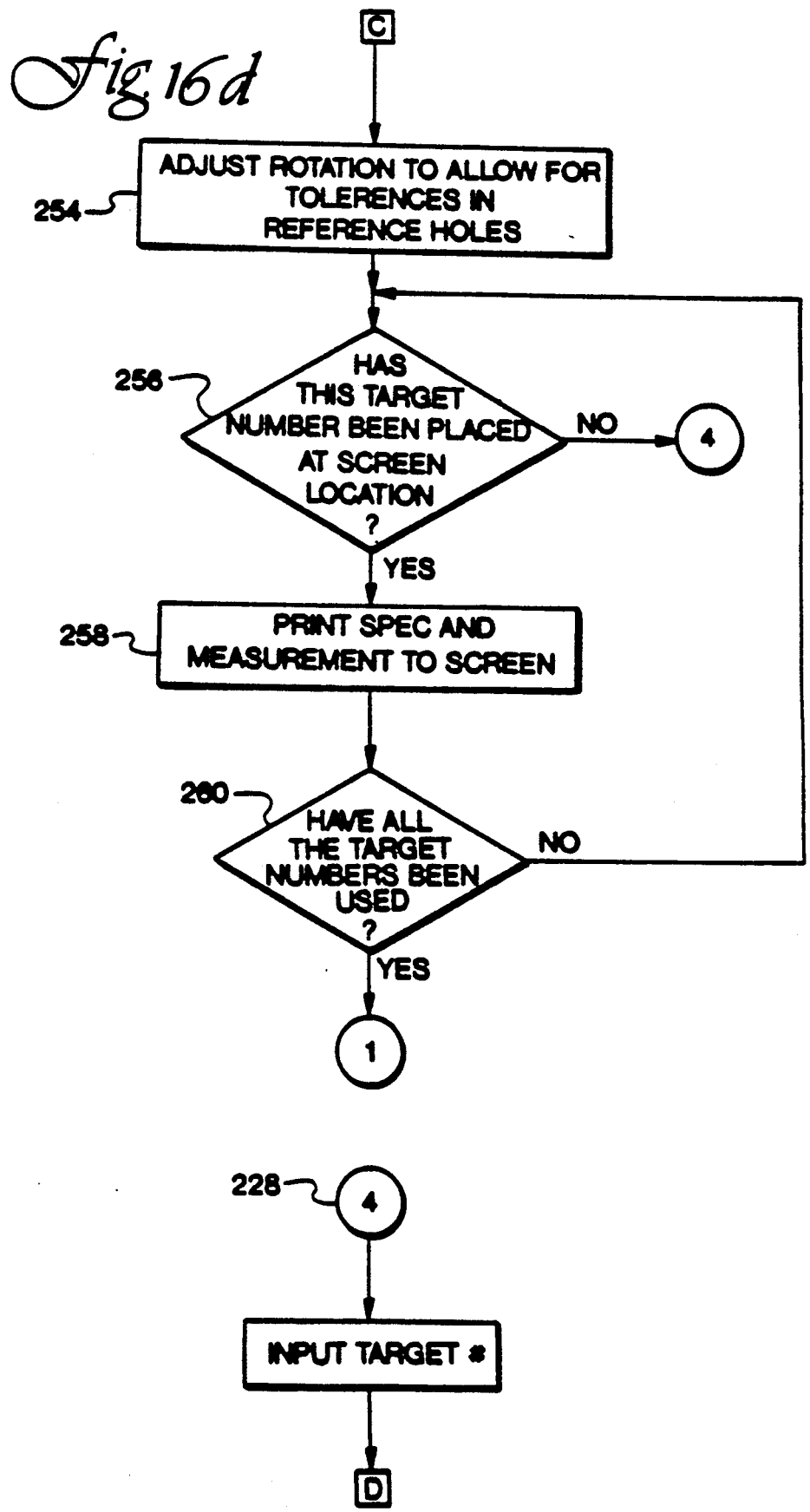

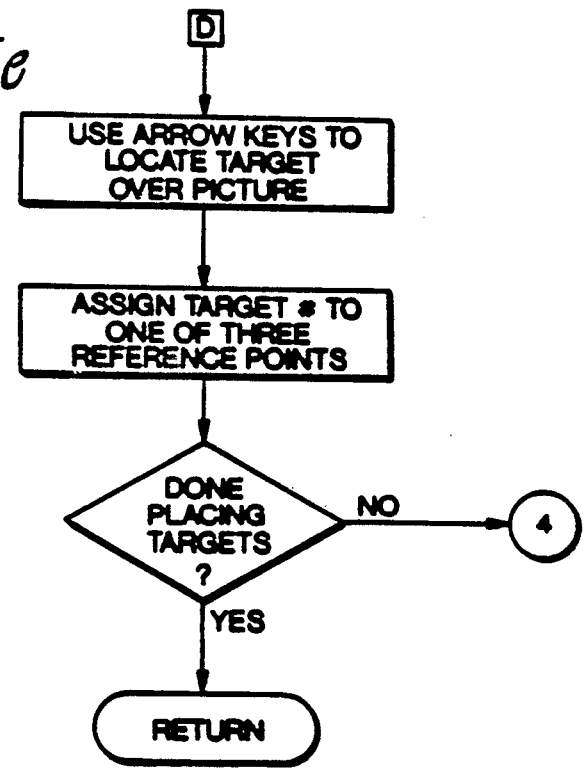
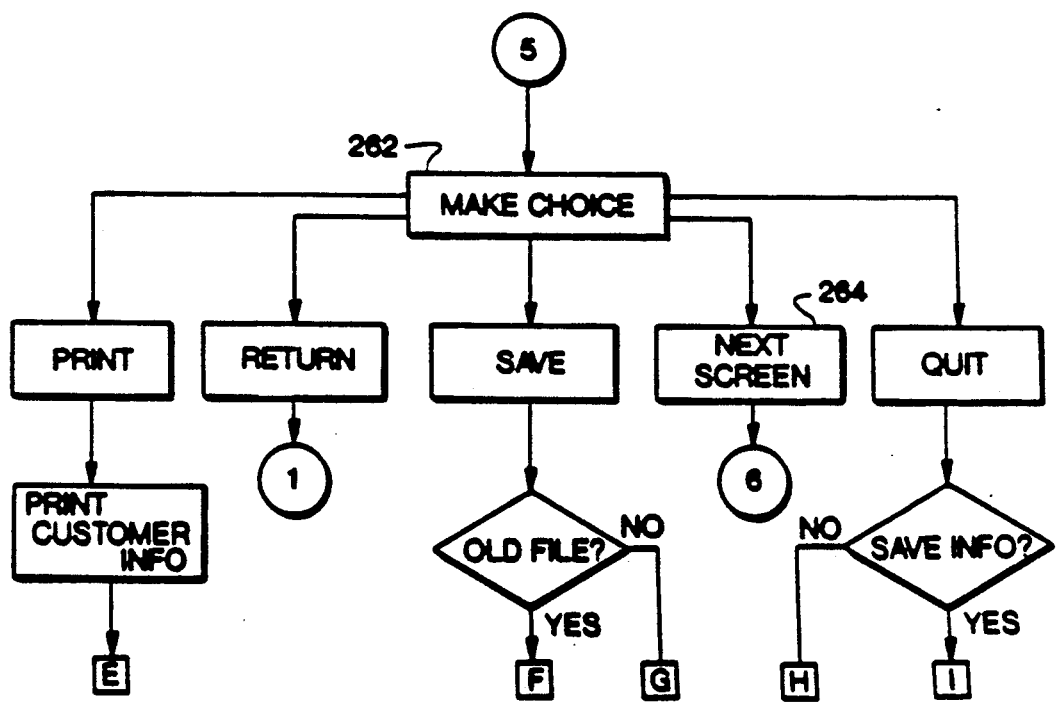
fig. 16e

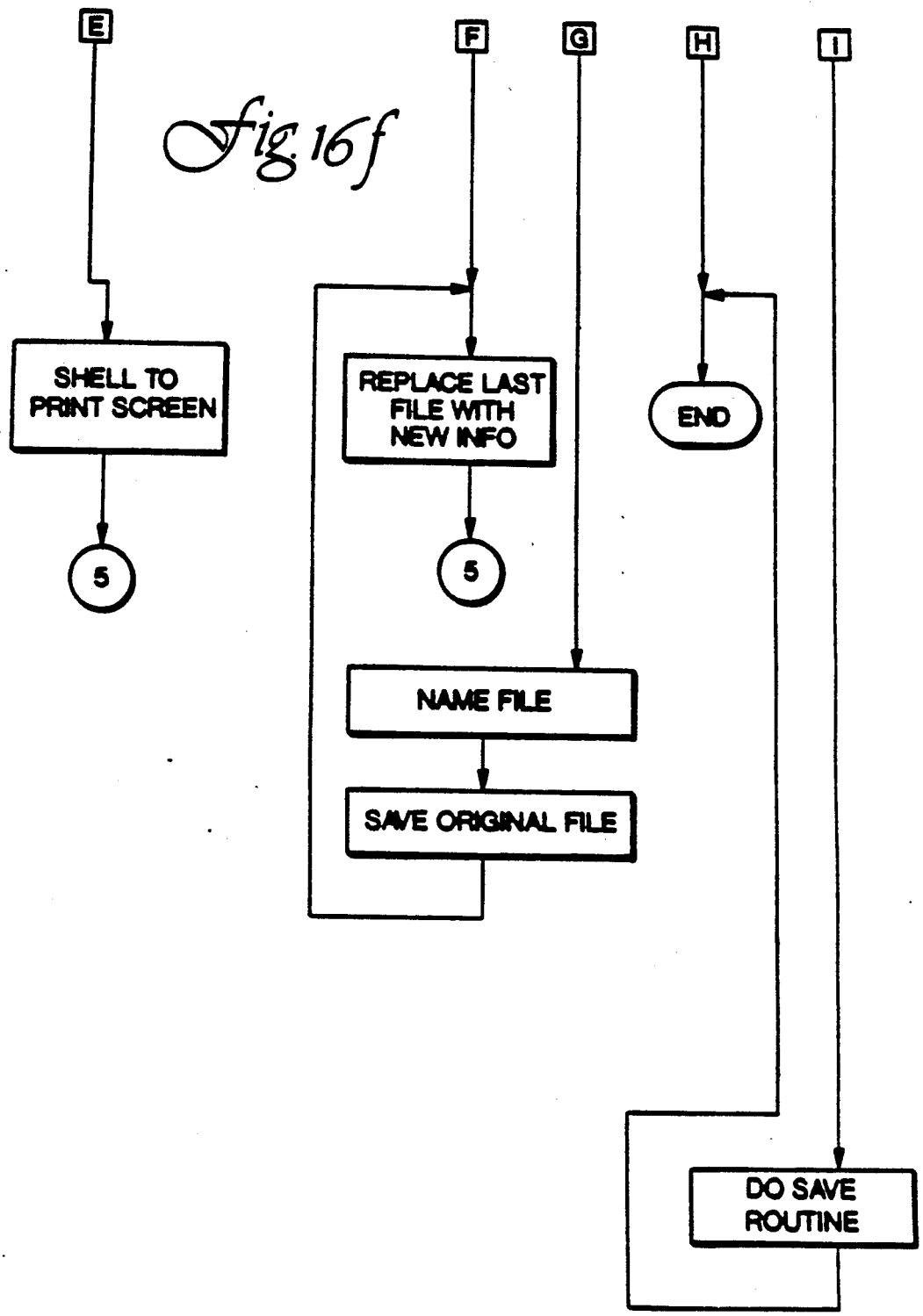

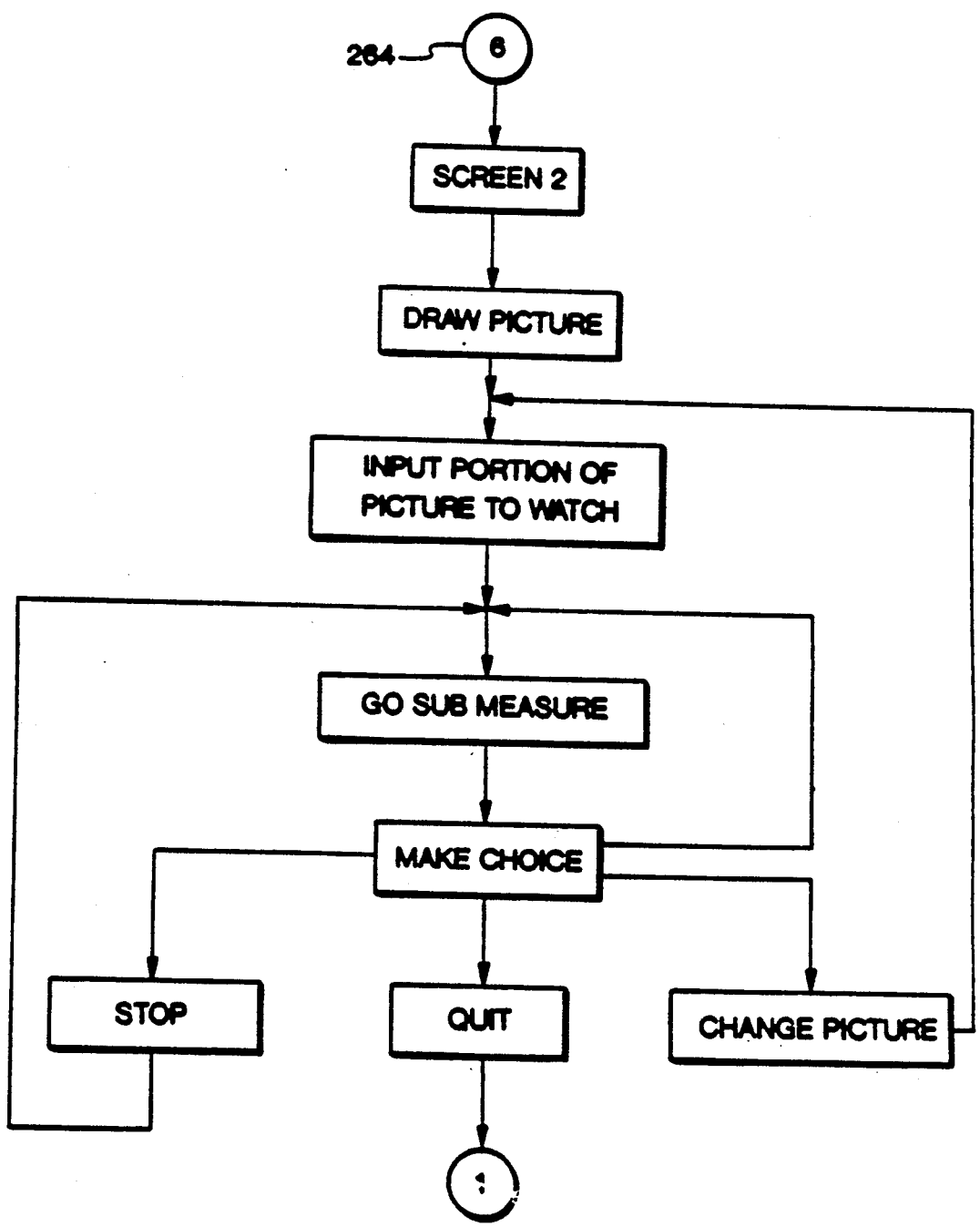

FIG. 17

```
╔══════════[ GLEN'S AUTO BODY ]══════════╗
║                                         ║
║         CUSTOMER INFORMATION            ║
║          Last          First            ║
║ Name: LEWIS,           C                ║
║ Address: 505 HUDSON CIRCLE              ║
║ City: RAMSTEAD                          ║
║ State: PA.   Zip: 70776                 ║
║ Phone: 103 293 3223                     ║
║ Insurance Co.: MARS INS. CO.            ║
║                                         ║
║          VEHICLE INFORMATION            ║
║ VIN #: 1C31C41YYJY                      ║
║ Year: 88        Make: CHRYSLER          ║
║ Model: LEBARON        Type: 2 DOOR      ║
║ Odometer: 35,332                        ║
║ Color: BROWN                            ║
║ License #: YAK319                       ║
║                                         ║
║ Repair Technician: G. DANIELSON         ║
║ Repair Order # 09376                    ║
║                                         ║
╚═════════════< CONTINUE >════════════════╝
```

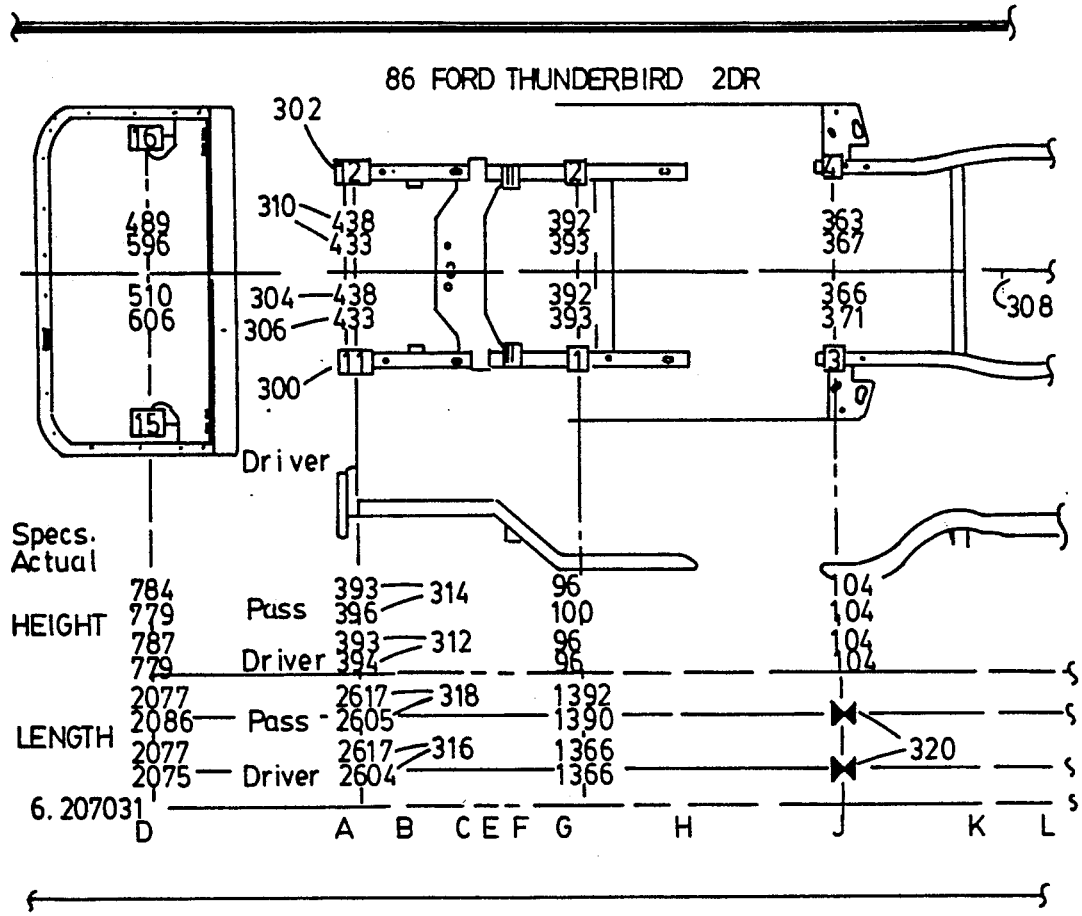

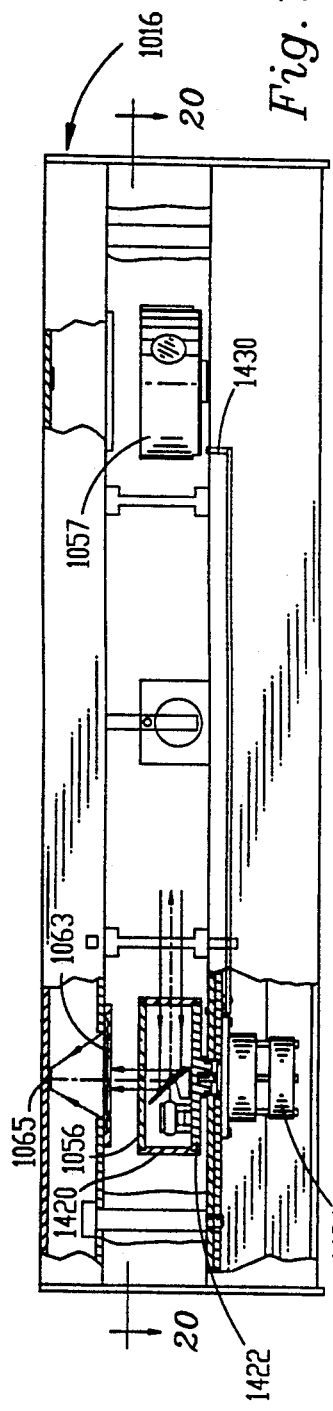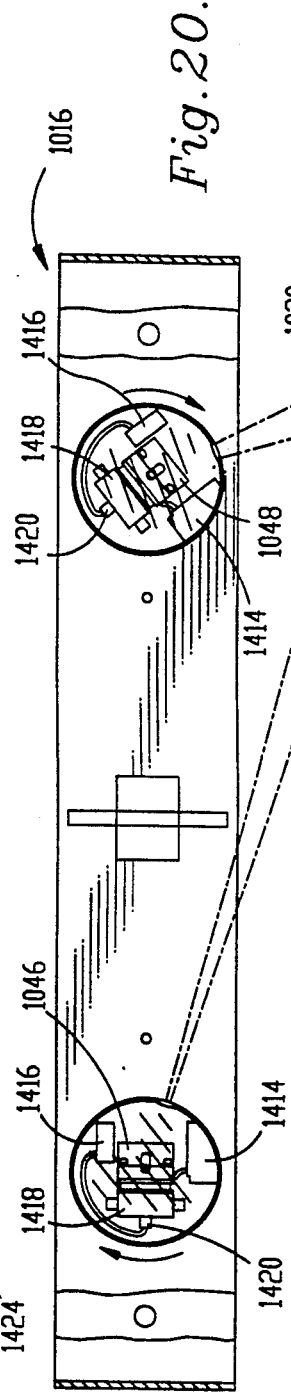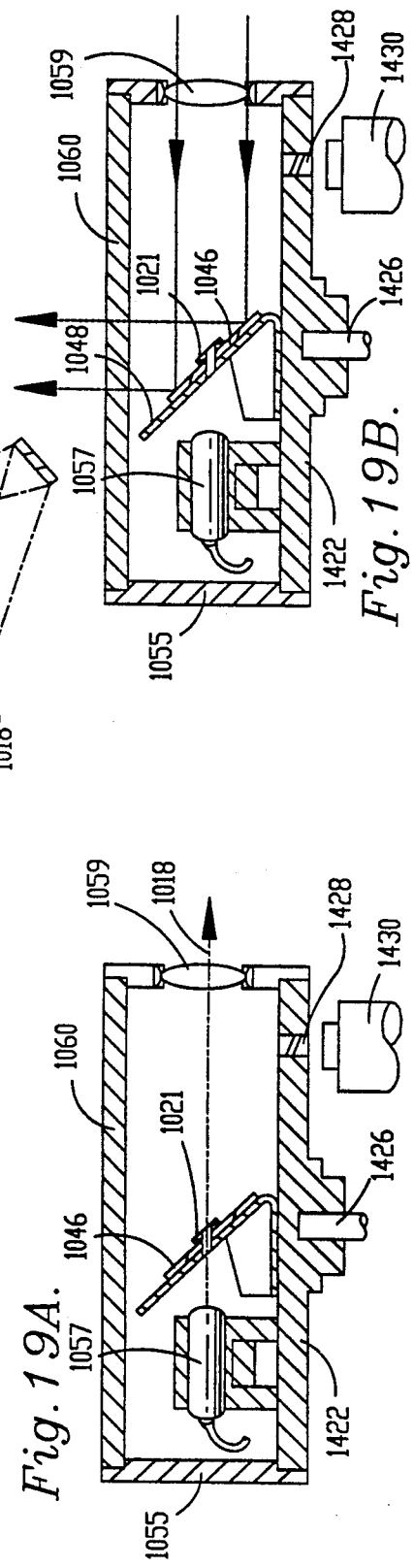

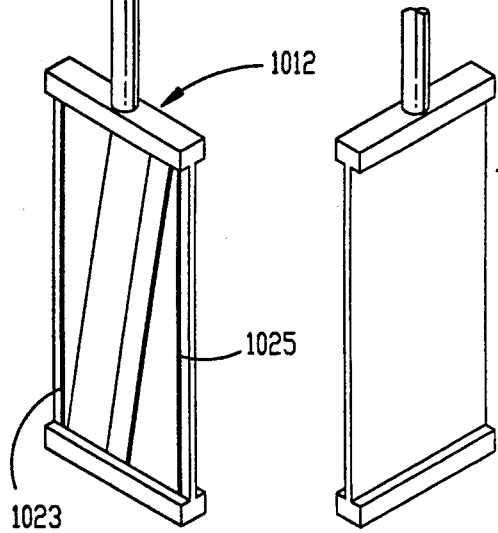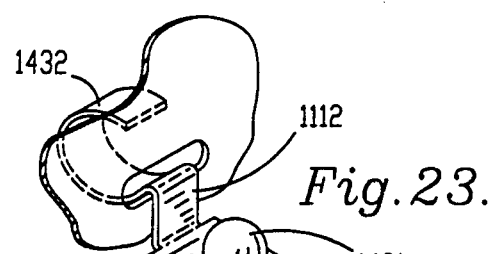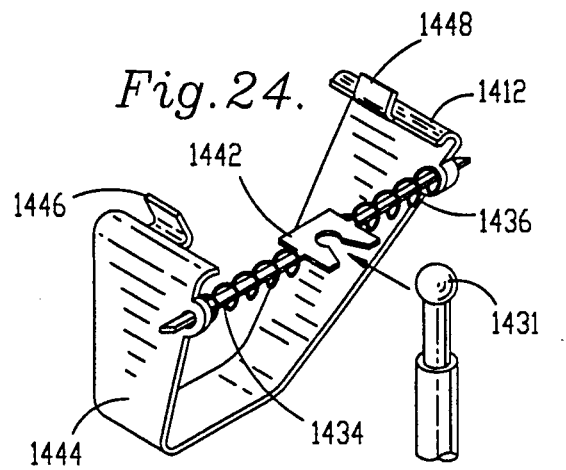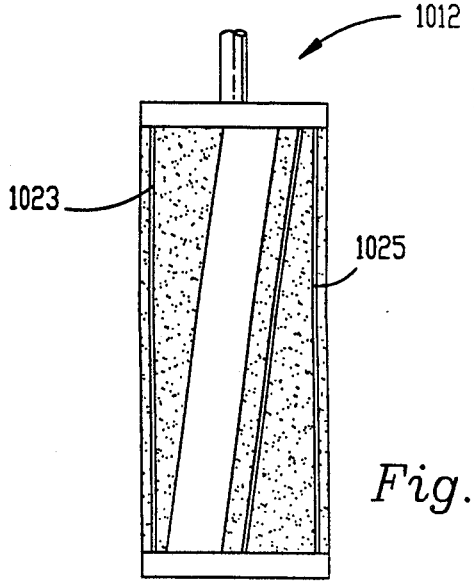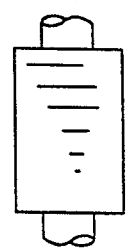

VEHICLE STRAIGHTENER MEASURING UNIT, MEASURING APPARATUS RELIANT ON REFLECTED BEAM(S), AND SOURCE, TARGETS AND METHOD

CROSS-REFERENCE TO RELATED APPLICATIONS

This is a continuation-in-part of patent application U.S. patent application Ser. No. 07/359,921 filed May 31, 1989, now U.S. Pat. No. 4,997,283 allowed, which is a continuation-in-part of patent application Ser. No. 329,010 filed Mar. 27, 1989, abandoned.

A microfiche appendix containing the source code of a computer program useful in accordance with the present invention is appended hereto as four sheets of microfiche containing 280 frames.

BACKGROUND OF THE INVENTION

Field of the Invention

This invention relates generally to apparatus for determining deformation in vehicle bodies and the like. More specifically, in its most preferred embodiment, this invention relates to apparatus for comparing the actual three dimensional spatial coordinates of manufacturer-provided reference points in a vehicle with their normal or specification values to thereby determine if the vehicle is deformed. In a general sense, this invention also concerns apparatus for determining two and three dimensional spatial co-ordinates of objects from each other and from a base which is physically distant from and unconnected with the objects, through the use of beams such as laser light beams.

In the past, vehicles such as automobiles had structural frames on which vehicles including body panels were built. Repair of accidental vehicle damage involved straightening the frame, and re-shaping or re-placing body panels. Vehicle technology then accelerated to meet needs such as low fuel consumption, and most passenger vehicles came to have unibody construction. In a unibody vehicle, no distinct frame exists apart from the body panels; instead, like an egg carton, the panels together form a "unibody". Substantial weight is saved.

With either form of vehicle, frame or unibody, repair is greatly speeded, and repair quality greatly improved, with a frame (and unibody) straightening machine such as described in U.S. Pat. No. Re. 31,636 issued to F. Lavell Chisum (incorporated by reference). The Chisum machine has attributes which have withstood the test of time, and the machine has been continuously manufactured and sold since its invention by Chief Automotive Systems, Inc. (or its predecessors) of Grand Island, Nebr. as the Chief EZ Liner TM.

The Chief EZ Liner TM machine speeds frame and unibody straightening, but was not intended to, and does not by itself, provide information as to the extent of straightening to be accomplished. Vehicles currently have manufacturer-provided unibody reference points, such as reference openings or holes, and specifications are published for the correct three-dimensional locations of the reference points relative to each other. If a vehicle is involved in an accident, these reference points will be moved from their "normal", "specification", or pre-accident positions with respect to each other. Most, if not all, vehicle frame and unibody straightening jobs require return of the vehicle reference points to within specification.

In association with the Chief EZ Liner TM machine, operators may use only their training and experience to measure the extent of straightening to be accomplished, but most often employ gauges such as the advanced gauges described in U.S. Pat. Nos. 4,689,888 and 4,731,936, issued Sep. 1, 1987 and Mar. 22, 1988, respectively (incorporated by reference). By referring to the data provided by manufacturers in KLM Body and Chassis Dimension and Specification Charts (Specification Manuals), and by employing gauges, operators can determine which portions of vehicles to straighten, and how deformed the vehicles are.

SUMMARY OF THE INVENTION

In a principal aspect, the invention of this patent specification constitutes a vehicle straightener measuring apparatus which, in its preferred embodiment, compares the actual three dimensional spatial coordinates of manufacturer-provided reference points or holes with their specification or normal value, using data provided by the manufacturer.

Main components of this principal aspect of the invention include a laser measuring unit, coded targets to be attached to reference holes and computer-based electronic equipment and logic which controls the laser measuring unit, performs calculations and displays the results.

In the most preferred form of this aspect, the laser measuring unit is preferably comprised of a helium-neon laser firing a 1 milliwatt 632.8 nanometers wavelength (red) laser beam. The laser beam is split into two laser beams by a 50/50 beam splitter, each beam then being directed to a rotating mirror. The rotating mirrors direct the laser beams in a 360° arc or circle, with both beams being directed in a single plane.

The beams sweep across the surfaces of coded targets attached to the reference holes on the vehicle. Each coded target contain stripes of reflective and non-reflective material. Each laser beam is reflected back to its source when it strikes the reflective stripes of the coded targets. These reflected beams are registered as "on" events (or counts) by the electronics on board the laser measuring unit. A counter counts the number of counts (as measured by an oscillator) from zero to the edge of each reflective, non-reflective border.

The computer-based electronic equipment and logic (hereafter "the computer") receives the count information for each target and computes the angle from the center of each mirror to the center of each target. With the two angle measurements (one for each mirror and target), and the known baseline between the two mirrors, the planar (X,Y) coordinates of each reference hole are computed using trigonometry. The third coordinate (Z coordinate) is calculated using Z coordinate-representative sizing of the reflective and non-reflective stripes on the coded targets. The actual three dimensional spatial coordinates of each reference hole relative to a calculated point and plane are calculated and displayed by the computer, along with the deviation from the normal or specification value provided by the manufacturer's data. Armed with this information the operator may then begin to straighten the frame or unibody. The operator may swiftly remeasure and continue straightening in desirable, small increments until the actual and specification values are substantially the same, whereby deformation is eliminated.

In additional and important principal aspects, the invention also constitutes a laser measuring unit as described, alternative laser measuring or "base" units within the scope of the claims, the targets as described, alternative targets within the scope of the claims, methods associated with the apparatus, such as methods of use, and apparatus of more generalized application employing the same principles and equipment as the described apparatus.

BRIEF DESCRIPTION OF THE DRAWING

A description of the preferred embodiments of the invention is hereafter provided. The description is detailed, with specific reference being made to the drawings in which:

FIG. 2 is a left side elevation view of FIG. 1, with the two embodiments of the invention shown positioned in association with a Chief EZ Liner TM frame straightening machine;

FIG. 3 is a sectional elevation taken along line 3—3 in FIG. 4;

FIG. 4 is a top plan view of the laser measuring unit assembly;

FIG. 5 is a perspective view of a coded target assembly;

FIG. 6 is a fragmentary perspective view of the reverse side of FIG. 5;

FIG. 7 is a perspective view of a coded target positioning clip;

FIG. 8 is a fragmentary perspective detail of a coded target positioning clip inserted in a manufacturer-provided reference hole;

FIG. 9 is a fragmentary diagram showing the dimensional alignment of the coded target and the reference hole;

FIGS. 13, 13(a) and 13(b) is a system block diagram;

FIGS. 15, 15(a) and 15(b) is an electronic circuit diagram;

FIGS. 16 and 16(a)-(g) is a computer program flow chart;

FIG. 17 is a diagram of a computer display;

FIG. 18 is a diagram of a computer display;

FIG. 19 is a partially sectioned elevation view, similar to FIG. 3, of a commercially preferred embodiment of a laser measuring unit of the invention;

FIG. 19A is a detail view of a hub assembly of the commercially preferred laser measuring unit of the invention, illustrating the scanning of the laser of the assembly;

FIG. 19B is a detail view similar to FIG. 19A, illustrating reflection of a laser beam from a target;

FIG. 20 is a sectional view of the commercially preferred laser measuring unit of FIG. 19, taken along line 20—20 of FIG. 19;

FIG. 21 is a perspective view of a commercially preferred coded target assembly;

FIG. 21A is a fragmentary perspective view of the reverse side of the target assembly of FIG. 21;

FIG. 22 is a diagram of a commercially preferred coded target, showing the sweep of laser beams;

FIG. 23 is a fragmentary perspective view of a first commercially preferred coded target positioning clip inserted in a manufacturer-provided reference opening, with a target tip hung in the clip;

FIG. 24 is a perspective view of a second commercially preferred target positioning clip, with a target tip adjacent the clip;

FIG. 25 is a side elevation view of the target positioning clip of FIG. 24, in a manufacturer-provided reference opening, with a target tip hung in the clip;

DETAILED DESCRIPTION OF THE PREFERRED EMBODIMENTS

Figure 1:
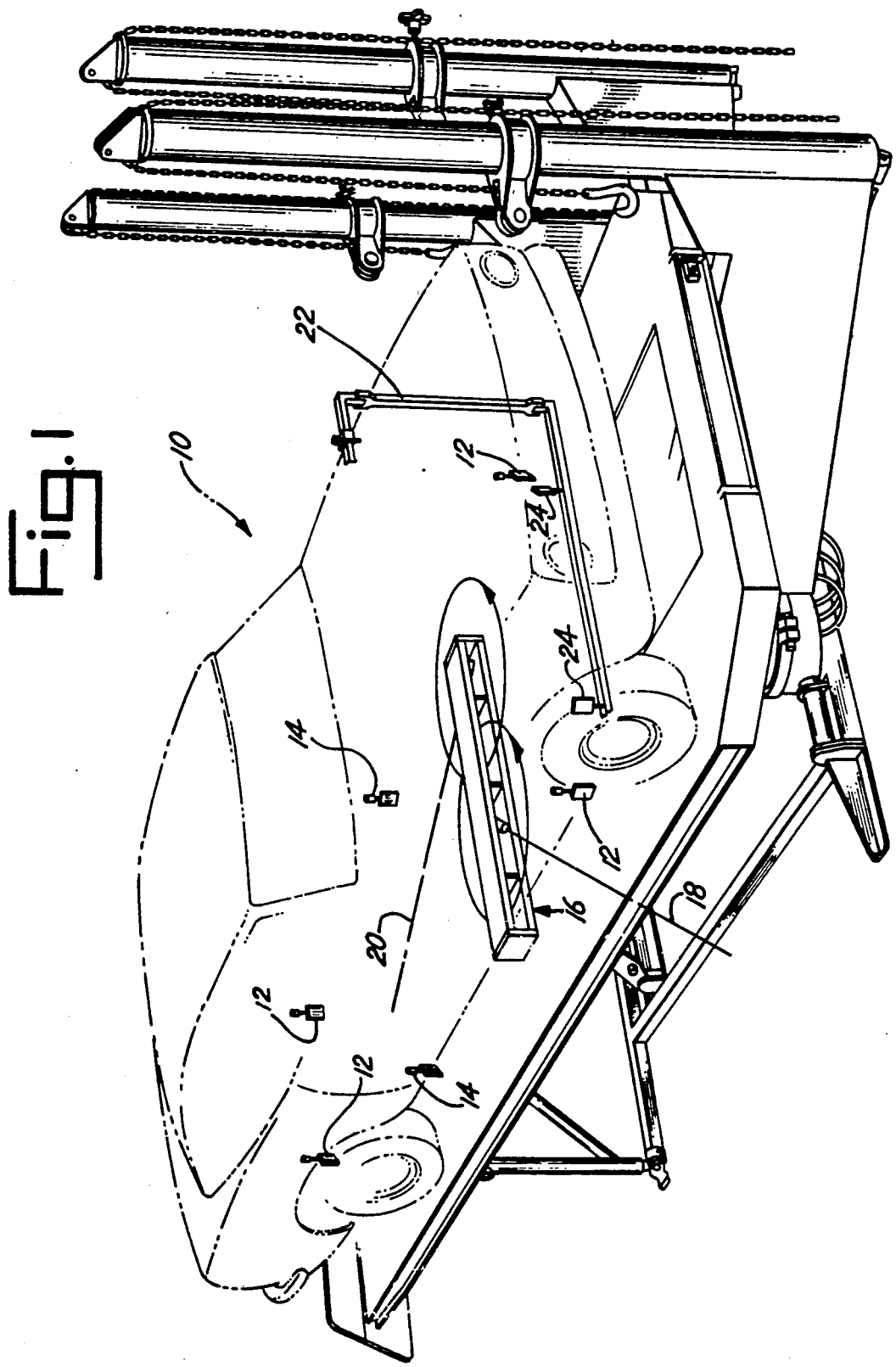
FIG. 1 is a perspective view of two embodiments of the invention, as seen beneath a typical vehicle as the two embodiments would be positioned in association with a Chief EZ Liner TM frame straightening machine, or with a laser measuring unit resting on the floor of a body shop, with neither the EZ Liner TM machine nor the floor shown fully, for clarity.

This invention may be embodied in many different forms for a variety of different uses. For clarity, there are shown in the drawings and described in detail herein specific preferred embodiments of the invention. The present disclosure is an exemplification of the principles of the invention and is intended to limit the invention to the particular embodiments illustrated only as appropriate based on the claims.

The Embodiments of FIGS. 1-18

Referring now to FIG. 1, a vehicle shown generally at 10 has first preferred coded targets 12 attached to or hanging from manufacturer-provided reference holes 14. The manufacturer of the vehicle provides data relating to the spatial positioning of reference holes 14 relative to some arbitrary reference plane (not shown). The number and location of these reference holes vary from vehicle to vehicle. Their existence as well as the data relating to the three dimensional position of any reference hole with respect to the arbitrary reference plane, is well known in the art. A first preferred vehicle laser measuring unit or straightener measuring unit, or base unit, is shown generally at 16. The unit is placed under the vehicle 10 on the floor, or on the platform of a Chief EZ Liner TM machine, as better shown in FIG. 2. Laser beams 18 and 20 emanate from the unit 16 and sweep around in clockwise or counterclockwise circles, striking the coded targets 12. Beams 18 and 20 are laser beams of wavelength 632.8 nanometers produced by a helium-neon laser in the preferred embodiment, although it is possible that imitators and followers of the invention may determine that the wavelength or type of beam is not significant to the operation of the invention. It is possible that such persons may determine that other types of waves can be used in the present invention: radar; sound; coherent light; incoherent light; or any other wave. It is contemplated that whatever the beam type or strength, the beam be reflected by the reflective portions of the coded targets and the reflected beam be registered as described below.

Coded targets 12 are used to determine if any deformations exist in the bottom or side portions of the vehicle unibody or frame. FIG. 1 is a composite of two separate embodiments. A first preferred mechanical transfer means 22 and coded targets 24 are used in a second embodiment for determining if any deformations exist in the top portion of the unibody or frame, as will be described more with respect to FIG. 11. The invention described herein can be used to measure the deviation of any point on a damaged unibody or frame from the normal position of such point using coded targets which are attached (hanging or using a mechanical transfer mechanism) to the manufacturer's reference holes.

Referring now to FIG. 2, the vehicle straightener measuring unit 16 is shown resting on the floor 26, under vehicle 10. Laser beams 18 and 20 are arranged so that they lie in the same plane as they scan a 360° circle. All the coded targets are arranged such that the reflective surfaces of the targets are struck by the scanning laser beams, as will be described in more detail with reference to FIG. 5.

Referring now to FIGS. 3 and 4, the vehicle straightener measuring unit 16 is shown in detail (FIG. 3 in section, FIG. 4 in top plan view) divided into two sections, an upper section 28 and a lower section 30, connected with end plates 32. Supports 34, 36, and 38 provide additional support for upper section 28. In its preferred embodiment, unit 16 measures 46 inches long, 5 inches wide and 7 inches high, although these measurements are not critical. The upper section 28 contains motors 40 which rotate the cylindrical mirror mounts 42. In the preferred embodiment, motors 40 are commercially available floppy disk drive motors, used for their precise and consistent revolutions per minute (RPM). The motors used in the current embodiment spin at 300 RPM, although it is contemplated that much faster motors may be used for more accurate readings. The speed of the motor is less critical than that the motor have a very constant and known number of revolutions per minute.

The mirror mounts 42 in the preferred embodiment are made from 1⅜ inch round aluminum rod which is cut to a length of 1 5/16 inches. The exact length and diameter of the rod is not critical to the invention. 3/16 inches of the motor end of mount 42 is machined to 1¼ inch round and center tapped for a number 6-32 bolt. End 44 of the mount is machined to a peak (as shown in FIG. 3) with each side of the peak being at a 45° angle with respect to the motor end. A 2¼ by 1½ inch mirror (46 and 48 respectively as shown in FIG. 3) is glued to the mirror mount 42 with its short centerline line-up with the peak of the mount. A silicon adhesive glues the mirror to the mount. The 45° angle was chosen so that beams 18 and 20 are preferably coplanar (seen in FIG. 2). The actual dimensions of the various parts are not important, as long as the two mirrors are positioned such that they will reflect any beams in a parallel fashion. The first mirror mount assembly is shown generally at 47, with the second assembly shown generally at 49. In the preferred embodiment, mirror mount assemblies 47 and 49 are arranged such that the centers of mirrors 46 and 48 are 750 millimeters apart. This distance may be varied but must be known since it establishes a baseline used for angle measurements (described more fully below).

A 1/16 by ⅜ inch vertical non-reflective black stripe 51 is attached to each mirror mount 42 just below the upper section 28. Stripe 51 is centered on mount 42 with respect to mirror 46. A light (opto-reflective) sensor 50 is mounted on centerline 52 (shown in FIG. 4). The sensor 50 directs a beam directly at mirror mount 42 and at a height such that the beam will strike the stripe 51. The beam is reflected back and received by sensor 50 until the beam strikes the stripe 51 which absorbs the light. Thus the sensor 50 can be used to indicate the beginning and end of one complete revolution of the mount 42.

A ⅛ by ¼ inch vertical stripe of reflective material 54 is fastened to the center of supports 34 and 36, respectively, on the side closest to each mirror assembly 47 and 49. The stripe is arranged such that the beam will strike the stripe when the mount rotates. The function of stripes 54 will be more fully explained below.

The lower section 30 of the vehicle straightener measuring unit holds beam generator 56. In the preferred embodiment the beam generator generates a 0.5-1 milliwatt laser beam of wavelength 632.8 nanometers produced by a helium-neon laser. As mentioned above, coherent light of the wavelength specified above has produced the best results to date. The particular wavelength of light used in the preferred embodiment was selected to minimize the effect of random reflections of the laser beam from walls and other objects as well as to allow ambient lighting in the area in which the device is in use.

When unit 16 if first built care must be taken to accurately set up the light path of the laser. Once this has been accomplished the laser is fastened securely in place to laser mounts 58 by welding, adhesive or other means. The laser beam generator 56 is walled off from the rest of the unit by wall 60. Laser beam 62 exists the walled off area through hole 64 in wall 60. Laser beam 62 proceeds through hole 66 in the side of a first cylindrical well shown generally at 68. Laser beam 62 then strikes a 50/50 beam splitter 70. Well 68 is arranged such that beam splitter 70 is directly below the center of mirror 48 of mirror assembly 47. Beam splitter 70 is mounted directly in the path of laser beam 62 and directs half of the beam straight up to strike the rotating mirror 48 (this half becomes beam 18, also shown in FIG. 1). The other half of the laser beam (which becomes beam 20, also shown in FIG. 1) continues through hole 72 in the first well 68 and continues on through hole 74 in the wall of the second cylindrical well shown generally as 76. The laser beam strikes a mirror 78 which is angled at 45° to direct the laser beam directly up at mirror 46 of the second mirror assembly 49. Well 76 and mirror 78 are positioned such that mirror 78 is directly below the center of mirror 46.

Thus, it can be seen that one laser beam will produce two beams 18 and 20 which will strike their respective rotating mirrors 46 and 48 and produce two coplanar beams which scan a 360° circle upon rotation of the mirrors. These beams will strike coded targets 12 or 24 (as described more fully below) and as each beam encounters the reflective portions of the coded targets the light will be almost instantly reflected directly back to strike the mirror. Reflected light is directed down at a 90° angle by the mirrors 46 or 48. A fresnel lens 80 is used to focus the reflected light due to the beam spread. The type of lens may be varied, as long as it can be used to focus light. This focused light is then passed through an optical bandpass filter 82 which will keep out stray reflections and background light. The light is then focused on a light detector 84 which is "ON" when light strikes it and "OFF" during the absence of light.

Figure 15A:
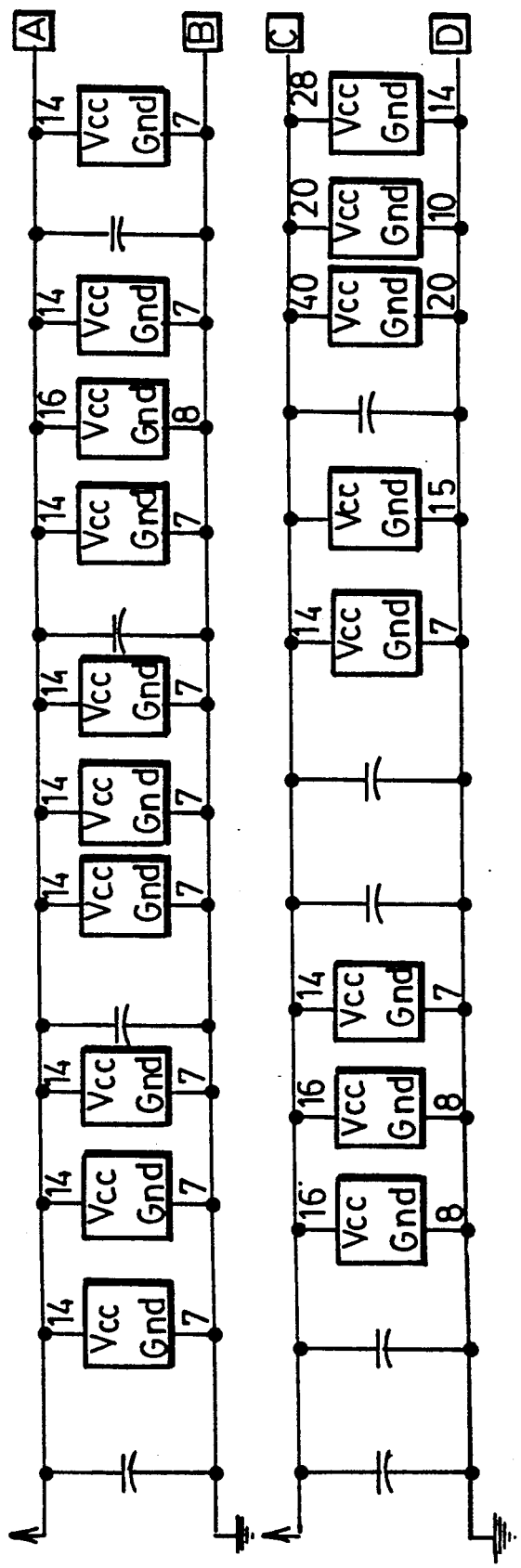
Figure 15B:
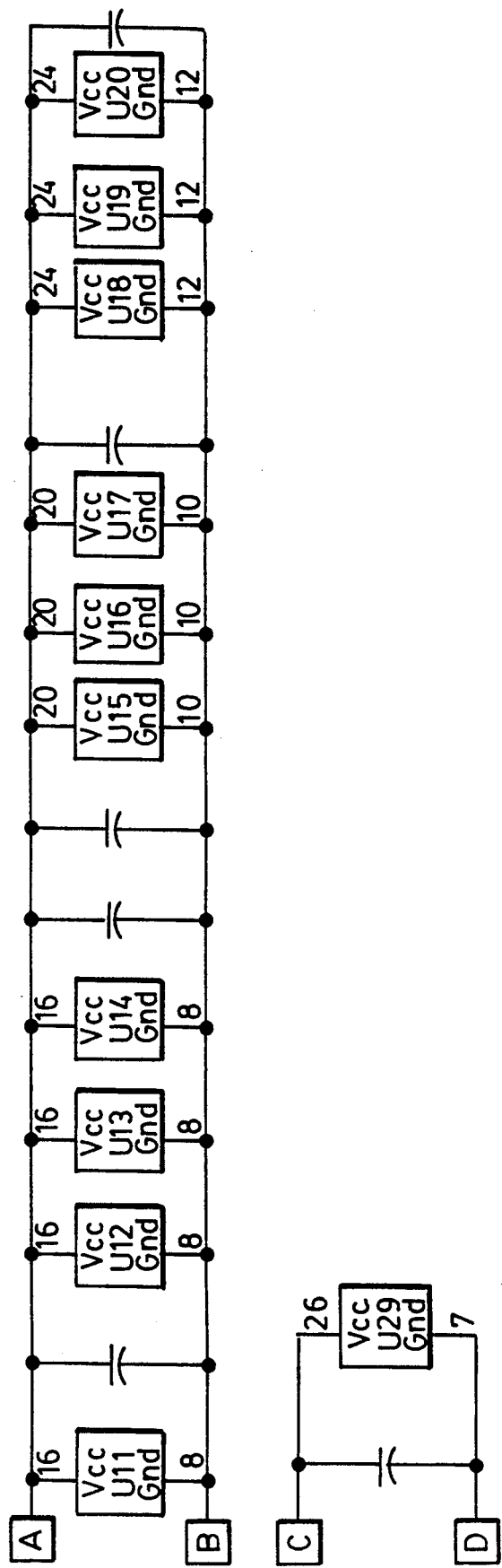

Power and signal bundle 86 provides power, control signals, and data transfer to and from the electronics 88 (described with reference to FIGS. 13-15).

Referring now more specifically to FIG. 4, the top plan view of FIG. 3 is shown with some parts shown in phantom. The rotation of rectangular mirror 48 of the first mirror assembly 46 is shown by dashed circle 90. Similarly, dashed circle 92 shows the rotation of rectangular mirror 46 of the second mirror assembly 49. Beam 18 is shown striking one edge of coded target 12 at 94. As the beam scans across the surface of target 12 it strikes various reflective areas. The light is reflected back toward mirror 48 where it causes the light detector to turn "ON". Beam 18 is shown at 96 at the opposite edge of target 12. Similarly, reference numerals 98 and 100 show beam 20 of the second mirror assembly hitting the same target 12.

Referring now to FIG. 5, a coded target (numerals 12 or 24 in FIG. 1) is comprised of a rectangular metal face area 102 measuring 75 mm wide and 125 mm high and 3/16 inch thick. The dimensions or material of the target are thought to be not critical as long as they are known values for use with the computer program. The top 104 of the target and the bottom 106 are slightly thicker, measuring 10 mm high and ⅜ inch thick. Top portion 104 is used for mounting hanging rod 108. The bottom portion 106 is used for balancing the target so that it hangs on true vertical. Hanging rod 108 is threaded at its top portion and screw 110 is used in combination with the clip (shown generally at 112 in FIGS. 7-9) to attach the target to the manufacturer-provided reference holes or other identified spots. An alternate top portion of hanging rod 108 eliminates screw 110 in favor of a spherical ball formed integrally with the hanging rod 108.

Face area 102 on the target has three reflective areas 114, 116, and 118 separated by non-reflective areas 120 and 122. The reflective areas are made of Reflexite prismatic reflex retro-reflector material obtained from Reflexite Co. Other reflective materials may be used but this is preferred. This material contains microscopic corner cube reflectors that will reflect light back towards its source. As long as the angle of incidence is less than 30° the light will be reflected back to its source. This allows some leeway in positioning the targets such that the laser beams can strike the target from a variety of angles and still be reflected back toward their respective sources. This also prevents the two laser beams from interfering with each other. The non-reflective areas 120 and 122 may be made of any material which does not reflect light, and may be tape strips, painted stripes, printed ink stripes, the absence of reflective material, or other materials which do not reflect light back toward its source. Reflective areas 114 and 118 vary in width over their length between the top and bottom of 102. Non-reflective areas 120 and 122 take the form of stripes of uniform width which are slanted with respect to face 102, at a slant of 26 mm per 125 mm of height in the preferred embodiment.

Referring now to FIG. 5, the back of a target is provided with an area 117 which can be labeled with a number of reference for ease of use.

Figure 10:
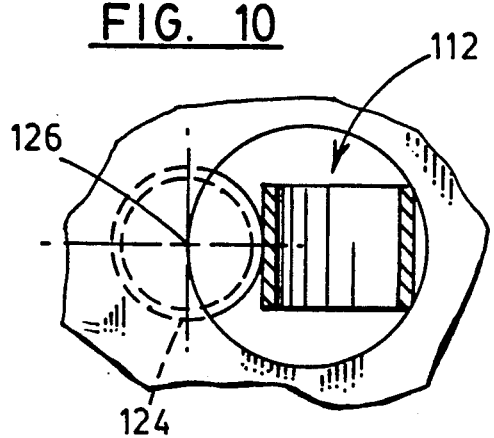
FIG. 10 is an enlarged sectional taken along line 10—10 of FIG. 9.

Referring now to FIGS. 7-10 a clip shown generally at 112 attaches the coded target by inserting screw 110 into screw receptacle 124. With an alternate top portion of hanging rod 108, a ball receptacle substitutes for screw receptacle 124. Clip 112 is shown inserted into a manufacturer-provided reference hole in FIG. 8. FIG. 9 shows that data point 126 (the point for which the manufacturer gives spatial coordinates with respect to a reference plane) is directly above the center of screw 110 and hanging rod 108. FIG. 10 shows that clip 112 registers the data point 126 with the near edge of the reference hole 14. Other mounting arrangements and positioning of the targets may be used within the broad aspects of this invention.

Figure 11:
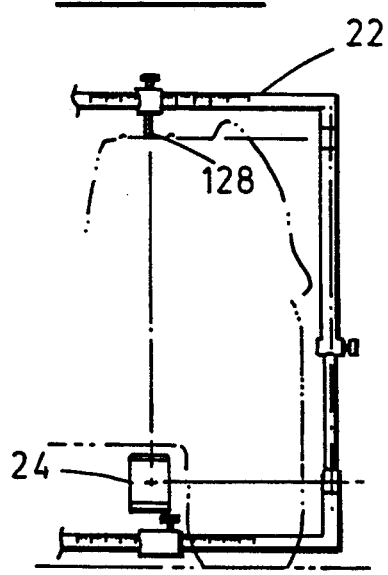
FIG. 11 is a fragmentary front elevation of a second embodiment of the invention.

Referring now to FIG. 11 (the second embodiment shown as a composite in FIG. 1) an alternative embodiment of the present invention uses coded targets 24 and a mechanical transfer system to transfer the coordinate information of point 128 using measuring assembly 22. The position of the target 24 may be determined with respect to the laser unit 16, thereby determining the spatial coordinates of any point on the unibody or top of the car by referring back to point 128 using the mechanical transfer assembly 22. The computer program referred to hereinbelow with reference to FIG. 16 may be modified easily to allow for the input of the various measurements provided by assembly 22. Modification allows the program to directly determine the displacement of point 128 from its normal position as determined by the manufacturers data concerning point 128.

Figure 12:
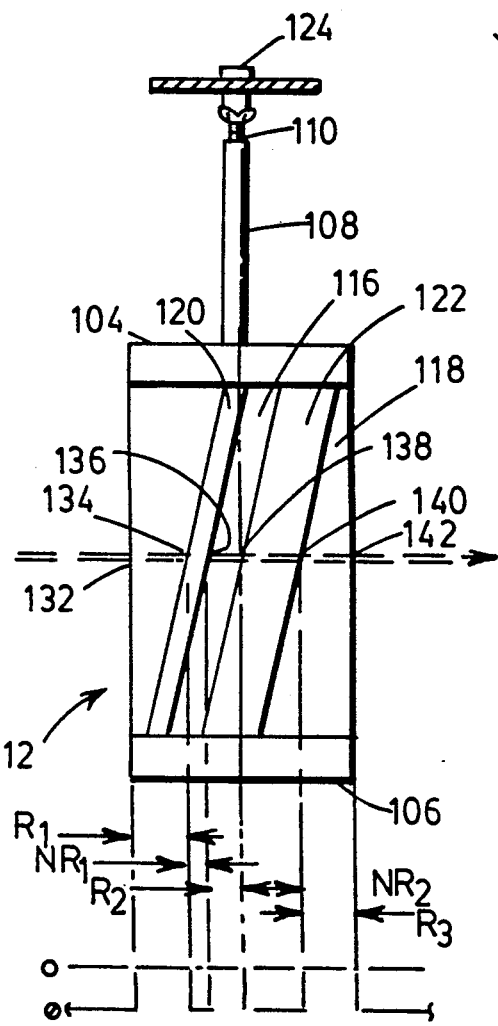
FIG. 12 is a diagram of a coded target, showing the sweep of laser beams.

Before referring to FIG. 12 and the coded targets in more detail, a brief explanation of the computer COUNTER is in order. The computer that runs the computer program referred to with reference to FIG. 16 runs at a set clock speed. This clock may be used to count increments of time, as is well known. As mirror mount assembly 47 or 49 rotates, sensors 50 (FIG. 3) determine the start of rotation of each by sensing the presence of stripe 51 as discussed with reference to FIG. 3. The computer program starts a COUNTER when it encounters this stripe 51 with this point being ABSOLUTE ZERO. The laser beam 18 (and 20) then strikes the leading edge of stripe 54 which turns "ON" detector 84. The total COUNTS from ABSOLUTELY ZERO until this point in time are saved. When the laser beam leaves the stripe 54, detector 84 turns "OFF". The total COUNTS from ABSOLUTELY ZERO until this point in time are saved as well. The two counts are added together and divided by two to determine the center of stripe 54. This variable is called CENTER. This determines RELATIVE ZERO which becomes the starting point of the 360° scan of the laser beams. The RELATIVE ZERO is used to minimize the effects of power fluctuations in the laser power. These fluctuations make the beam width diameter greater or smaller. Because a wider beam will reflect light sooner than a narrow beam, power fluctuations can effect the readings. By using RELATIVE ZERO, the unit compensates for these varying power fluctuations. Because detector 84 charges up to "ON" much faster than it discharges to "OFF" as the computer calculates the center of stripe 54 any power fluctuations are taken into account. The power will be the same for the rest of the scan of the 360° thereby in effect calibrating the unit for the entire 360° scan. These power fluctuations may also be minimized by letting the laser units warm up for at least 5 minutes before taking any measurements, with at least 15 minutes being preferred.

Referring now to FIG. 12, a front face view of a coded target is shown with a beam 18 (or 20) scanning across the face. The laser beam strikes the reflective edge of the target at 132 (which is the first reflective area 114), causing detector 84 to turn "ON". The computer program stores the number of COUNTS from ABSOLUTE ZERO in a variable called TARGET.-BEG. When the laser beam reaches the edge of the first non-reflective stripe 120 at 134 detector 84 turns "OFF" due to lack of reflected light and the computer program stores the number of COUNTS from ABSOLUTE ZERO in a variable called BAR.BEG. The graph below FIG. 12 shows the period when detector 84 is "ON" as $R_1$. The end of the first non-reflective stripe and the start of the code area and second reflective stripe 116 is shown at 136 and the COUNTS are stored in a variable called CODE.BEG. Detector 84 is "OFF" as shown by $NR_1$. At 138 the laser beam strikes the edge of the second non-reflective stripe 122, and the computer program stores the COUNTS in a variable called CODE.END. $R_2$ shows that detector 84 was "ON" until this point. $NR_2$ shows that the detector 84 is "OFF" until the laser reaches the edge of the last reflective strip 116 at 140, where the computer stores the COUNTS in a variable called BAR.END. $R_3$ shows that the detector 84 is "ON" until the laser beam reaches the end of the target at 142 at which point the computer program stores the COUNTS in a variable called TARGET.END. When the laser beam completes its 360° sweep the total number of COUNTS that it took to complete the sweep are stored in a variable called ONE.REV.

The center of the target is computed by adding TARGET.BEG and TARGET.END together and dividing by 2 to get TARGET.CENTER. To compute the angle between the baseline (defined as the line between the center of the two mirrors 46 and 48) and the laser beam at TARGET.CENTER, the formula below is used:

((TARGET.CENTER−CENTER)/ONE.-REV)*360

This formula takes the number of COUNTS from ABSOLUTE ZERO until the center of the target is reached and subtracts the number of counts between ABSOLUTE ZERO and RELATIVE ZERO to take calibration into account. That number is divided by the total number of COUNTS in one revolution then multiplied by 360 to determine the angle in degrees. This angle is called ANGLE1. The same process is performed for the second laser beam. The angle from the second mirror to the same target center is called ANGLE2.

Trigonometry is used to determine the "X" and "Y" coordinates of the target with respect to the laser unit. The center of mirror 48 on the first mirror assembly 47 is considered the origin. The formulas are shown below:

Width(X)=Baseline* Tan (ANGLE2)/(Tan (ANGLE2)−Tan (ANGLE1)) Length (Y)=X* Tan (ANGLE1)

The (X,Y) coordinate system is defined with X=0 being the center of mirror 48 on the first mirror assembly 47, and perpendicular to the Baseline between the two mirror centers. Y=0 is defined as the Baseline. Z=0 is the plane defined by the scanning laser beams.

The "Z" coordinate is calculated using the fact that the two non-reflective strips are slanted as shown on the face 102 of coded target 12 in FIG. 12. The non-reflective stripes are at a slant of 26 mm per 125 mm of height (varying width over height). This slant value can vary, with a greater slant increasing accuracy. The present value is the minimum slant required at present to achieve extreme accuracy. The ratio of the number of COUNTS represented by $R_1$ and the number of COUNTS represented by $R_3$, when compared to the total known height of the target will give the exact height that the laser beam crossed the target. This number is then added to the known length of the hanging rod 108 clip assembly to get the exact "Z" coordinate of data point 126.

Each target is coded by varying the width of the second reflective stripe and the location of the second reflective stripe. The formulas used to calculate the target are:

(CODE.END−CODE.BEG)/(TARGET.END−TARGET.BEG)*100

(CODE.BEG−BAR.BEG/(BAR.END−CODE.END)*100

The first formula compares the center reflective stripe 116 width to the total target width and converts it to a percent of the total target width. The second formula compares the first non-reflective stripe 114 to the last non-reflective stripe 118, and converts it to a percentage. The width of the second non-reflective stripe is varied in ⅛ inch increments. This allows 8 separate positions which allows for 36 different target codes. These numbers can be increased by changing the width of the second non-reflective stripe in smaller increments. Coded targets allow the user to hang any target from any reference hole 14, allowing the computer to determine which target is hanging where.

It is thought highly desirable to use two laser beams to determine the (X,Y,Z) coordinates of the data point 126. One laser beam may be used, but it has been found that by using triangulation with two laser beams a much more accurate reading of the coordinates is found.

Figure 13A:
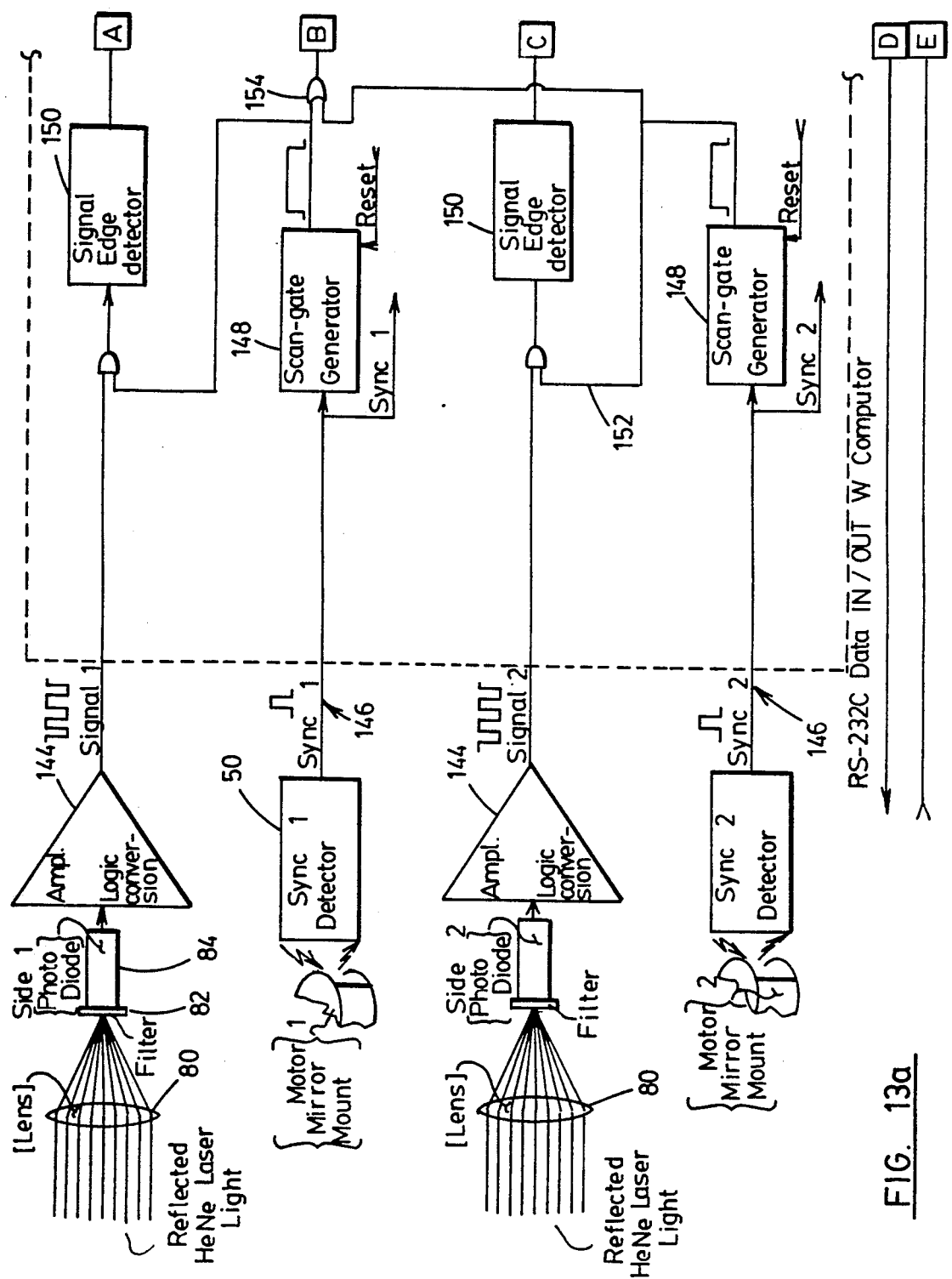
Figure 13B:
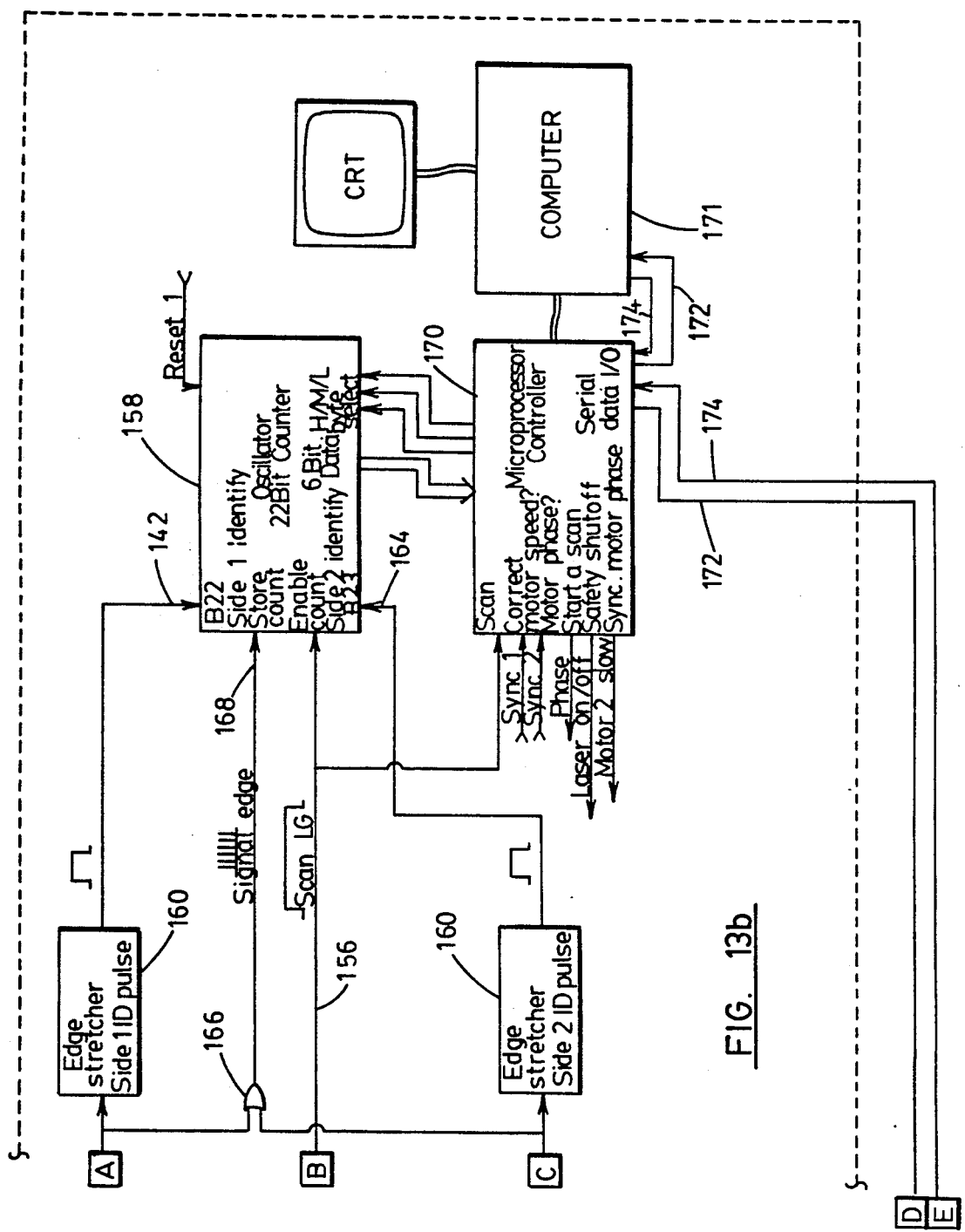
Figure 14A:
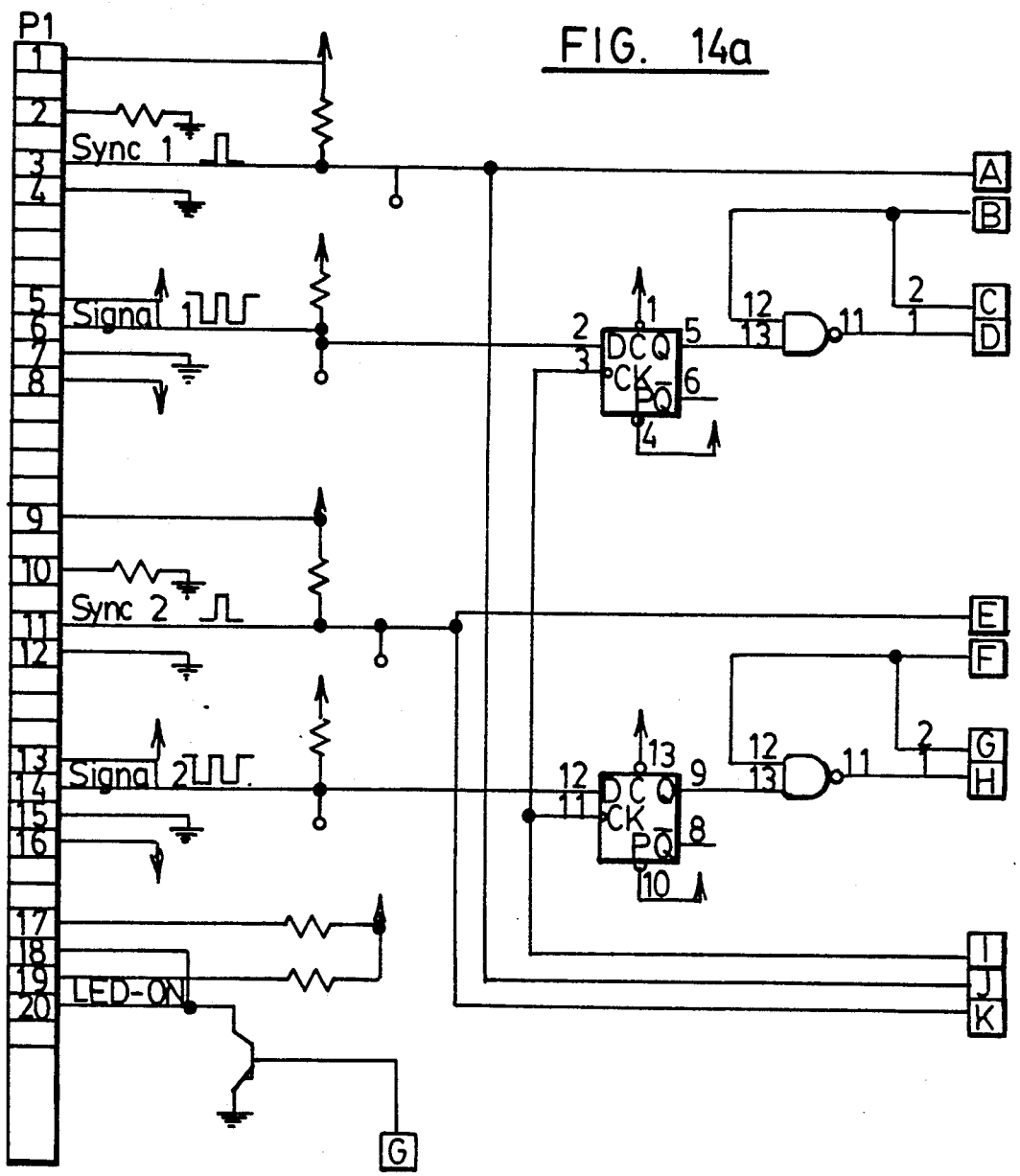
FIGS. 14 and 14(a)-14(n) is an electronic circuit diagram.
Figure 14B:
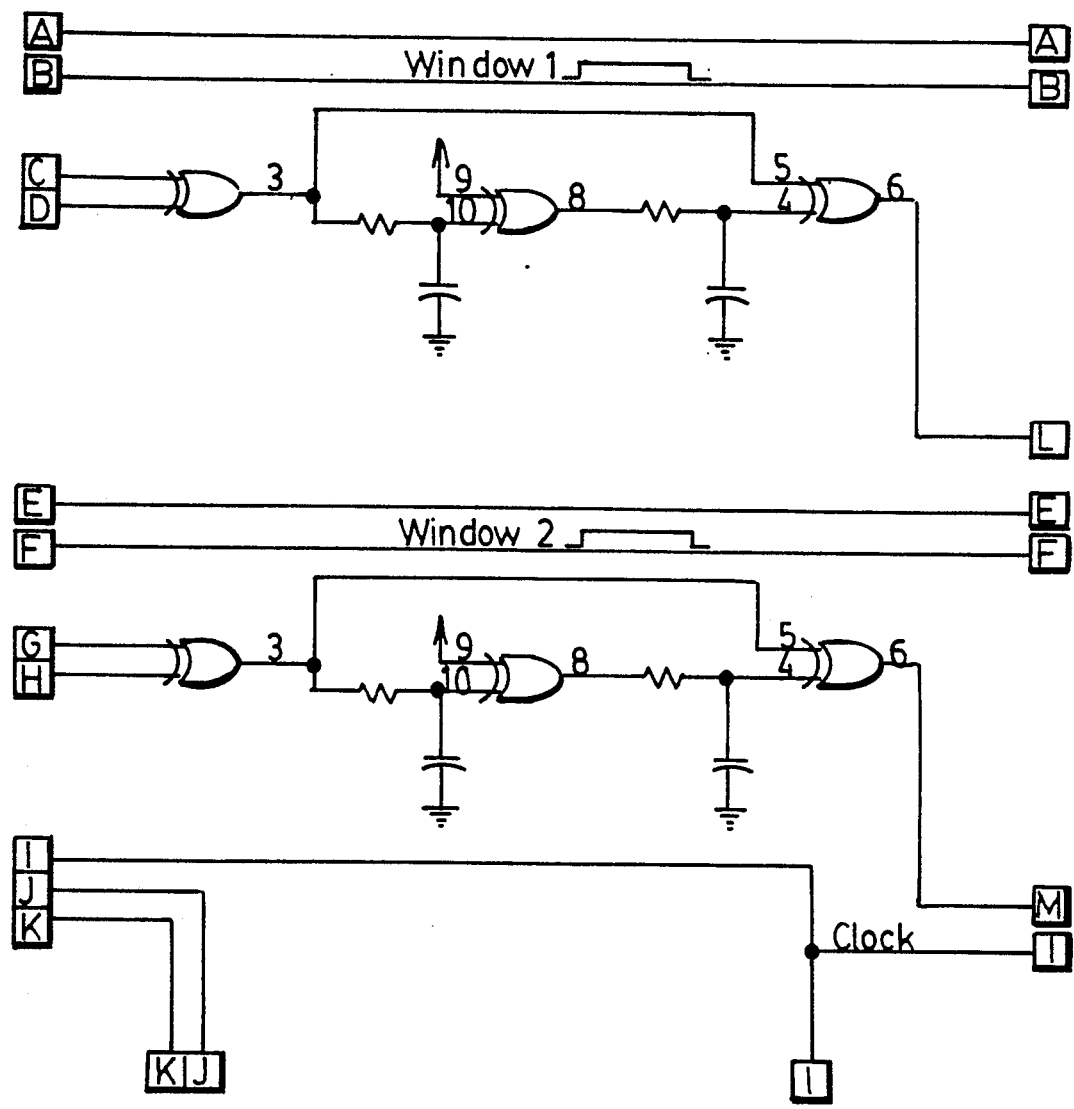
Figure 14C:
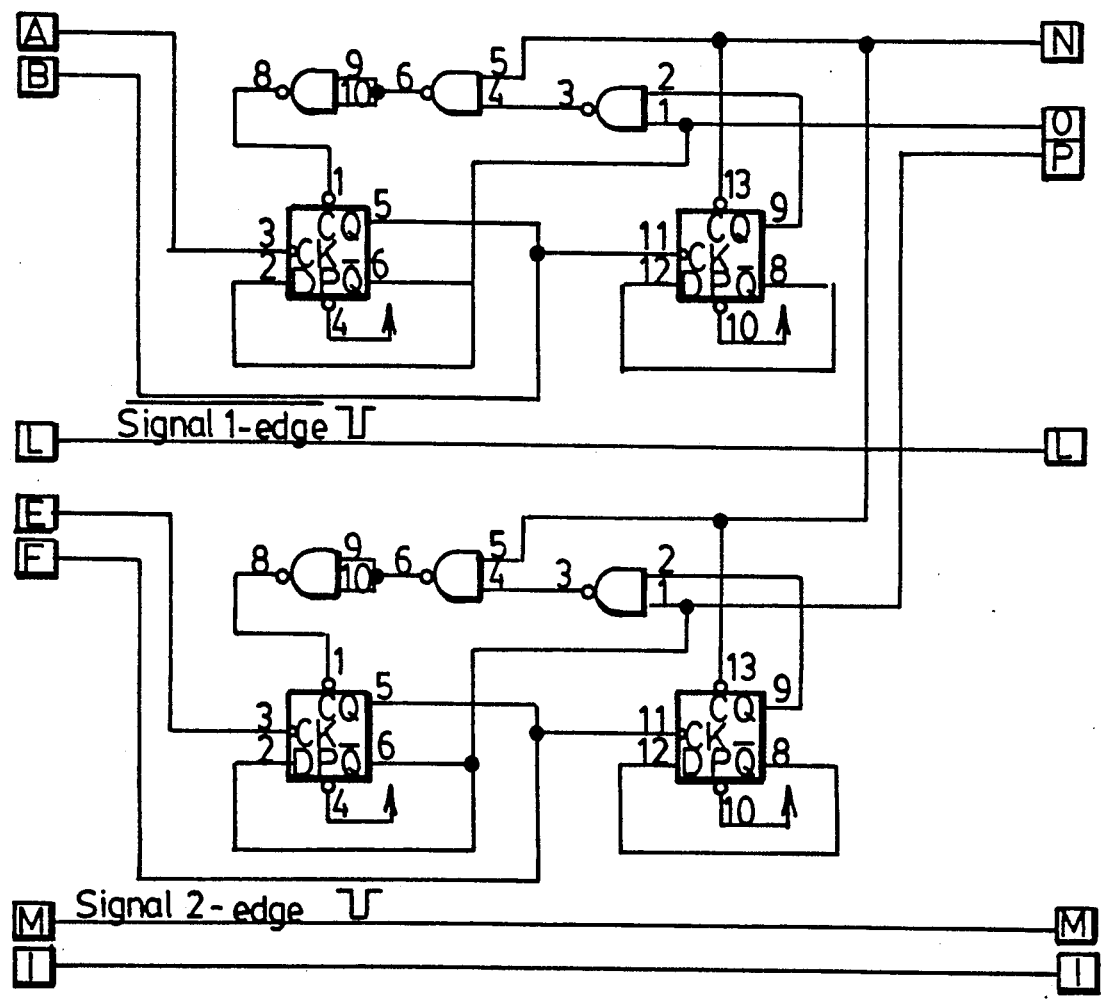
Figure 14D:
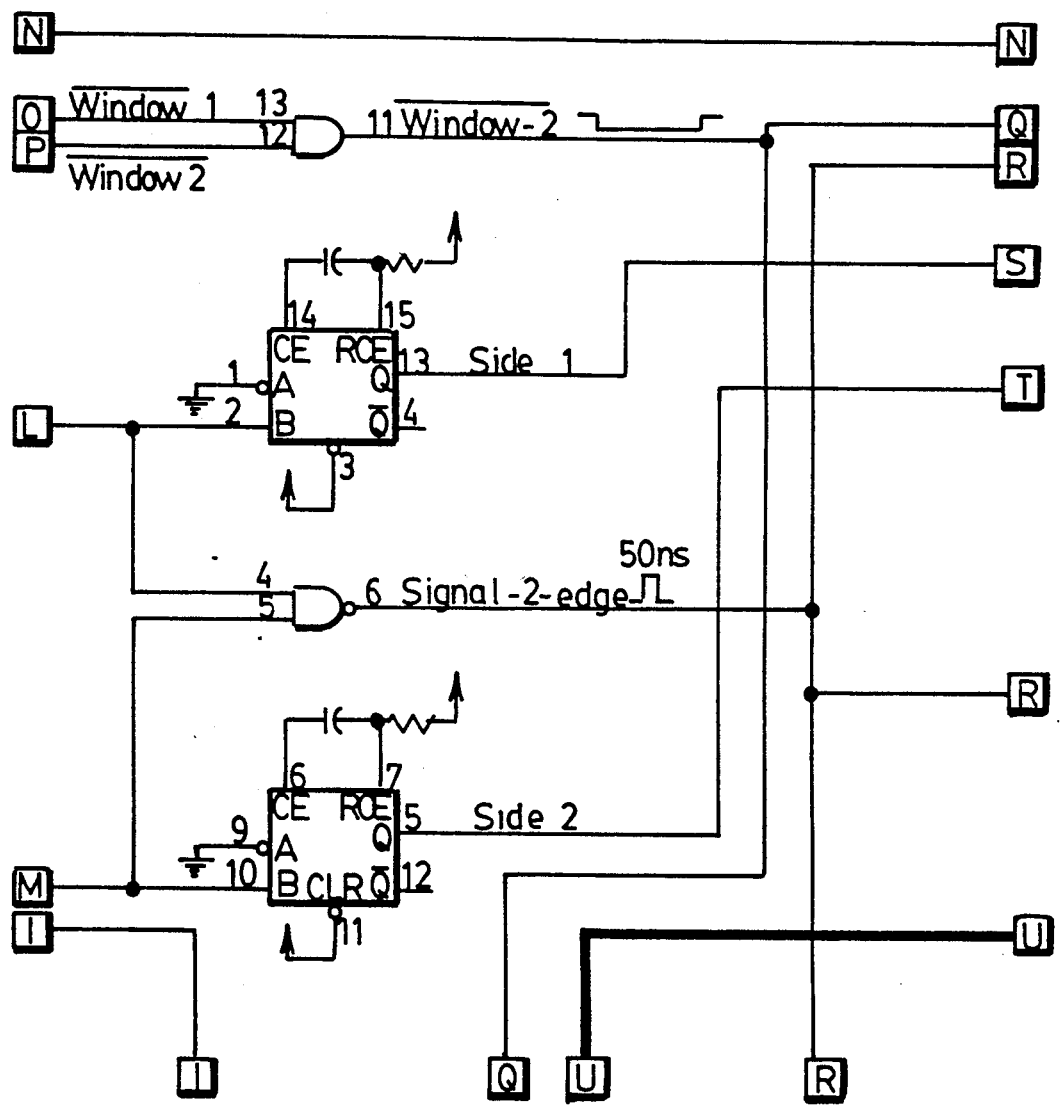
Figure 14E:
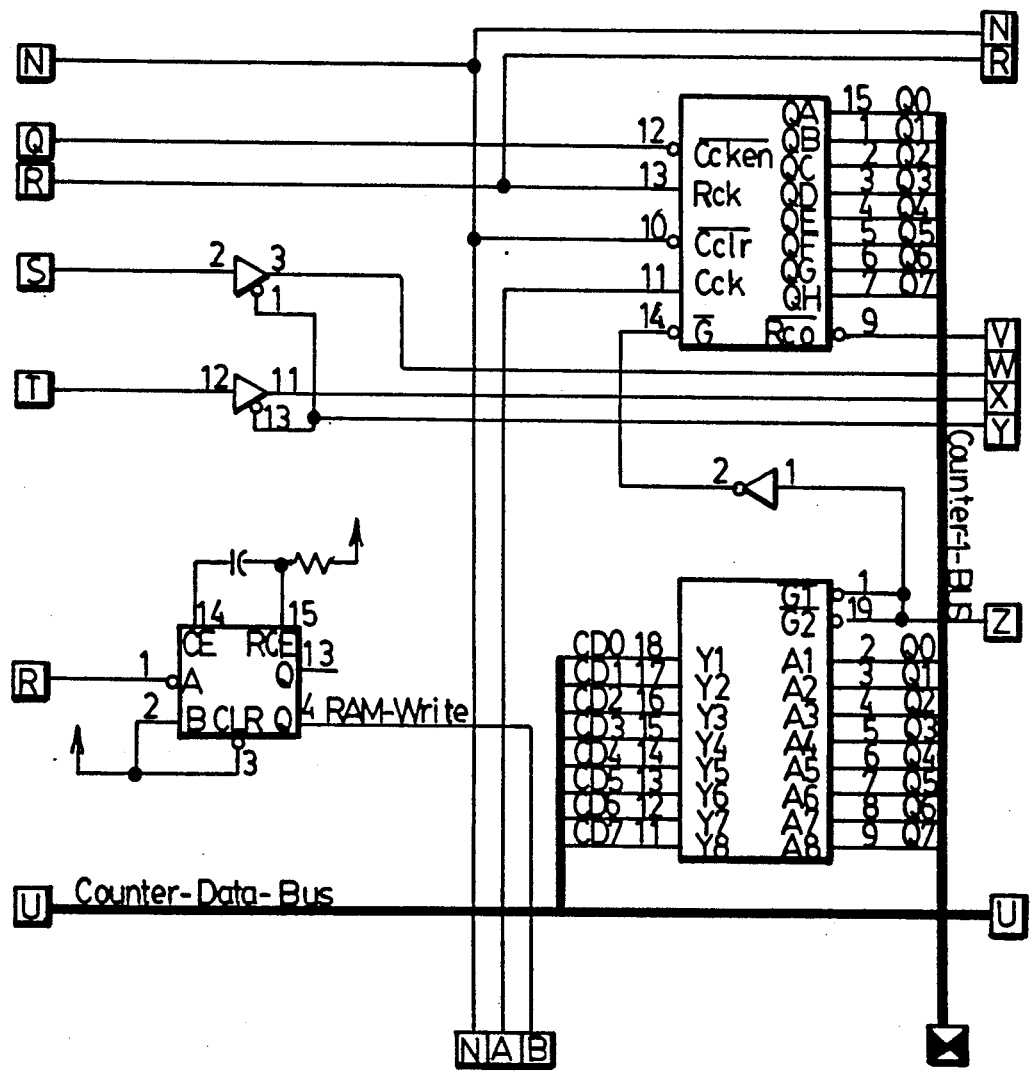
Figure 14F:
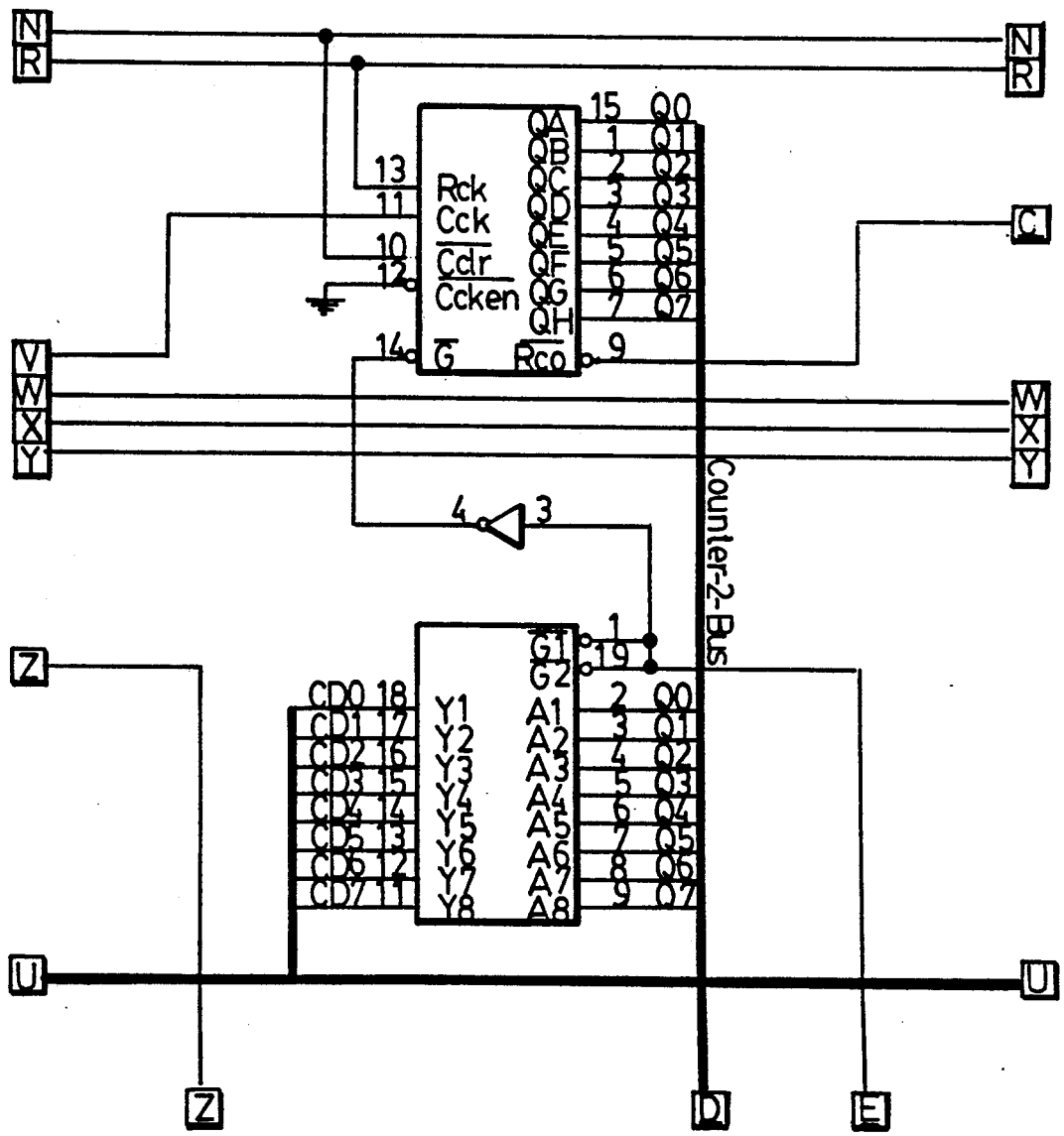
Figure 14G:
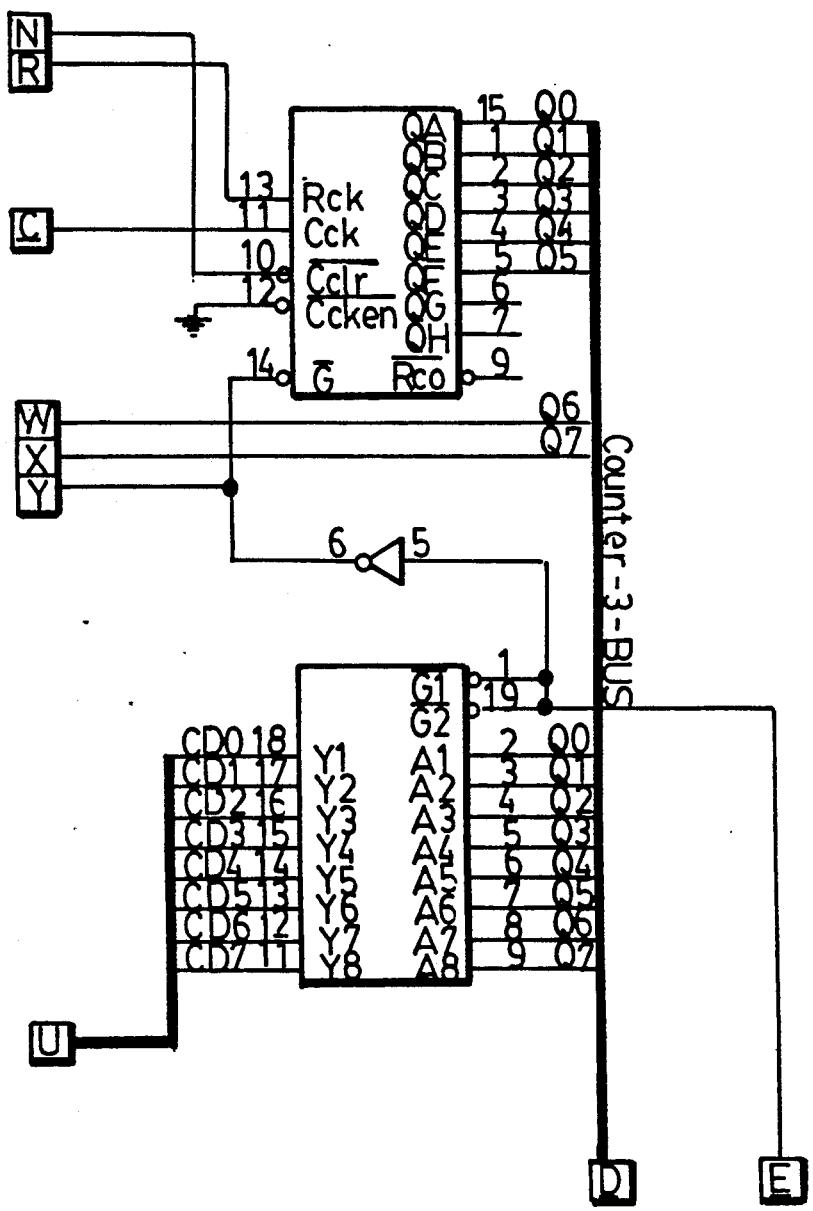
Figure 14H:
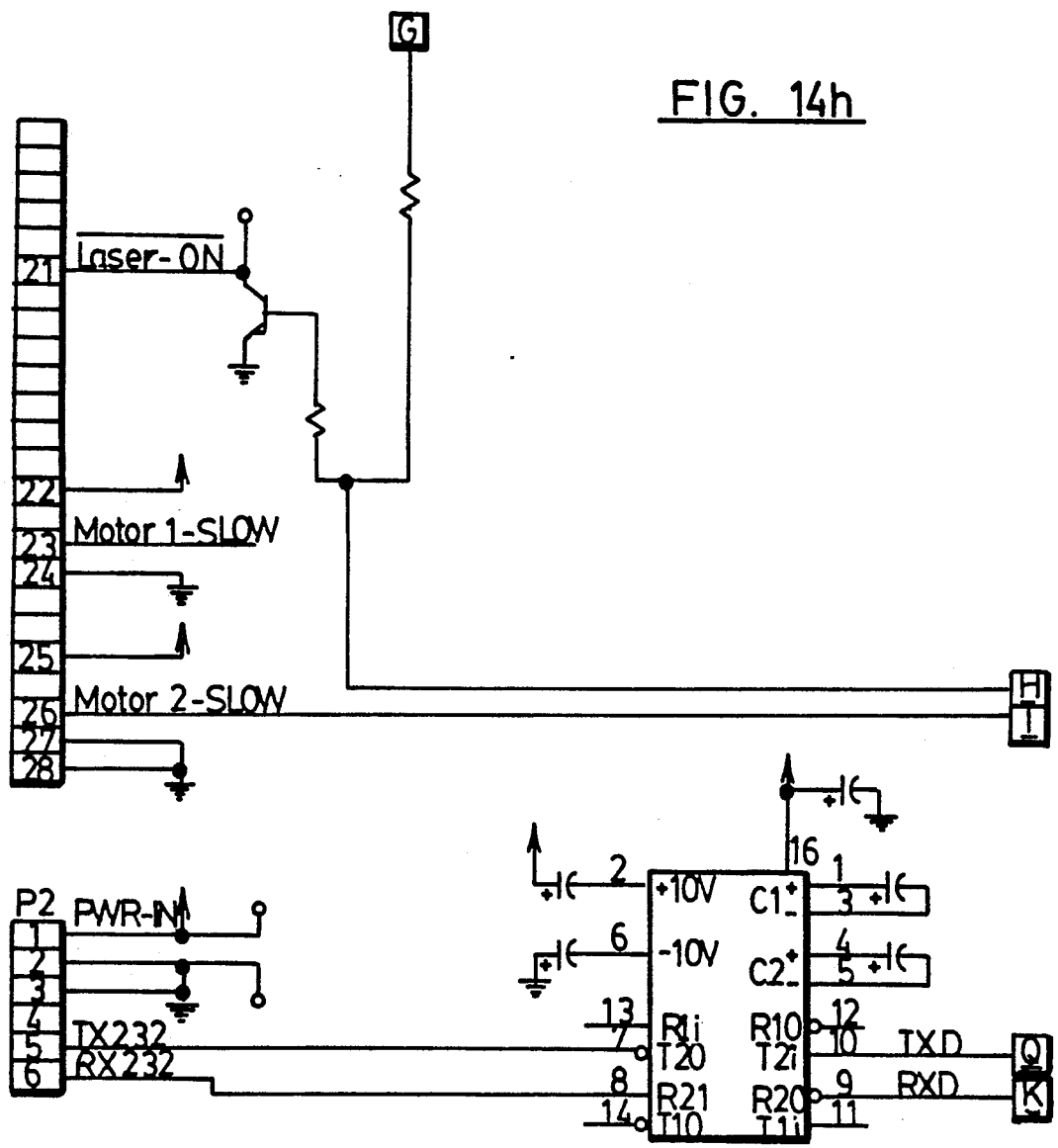
Figure 14I:
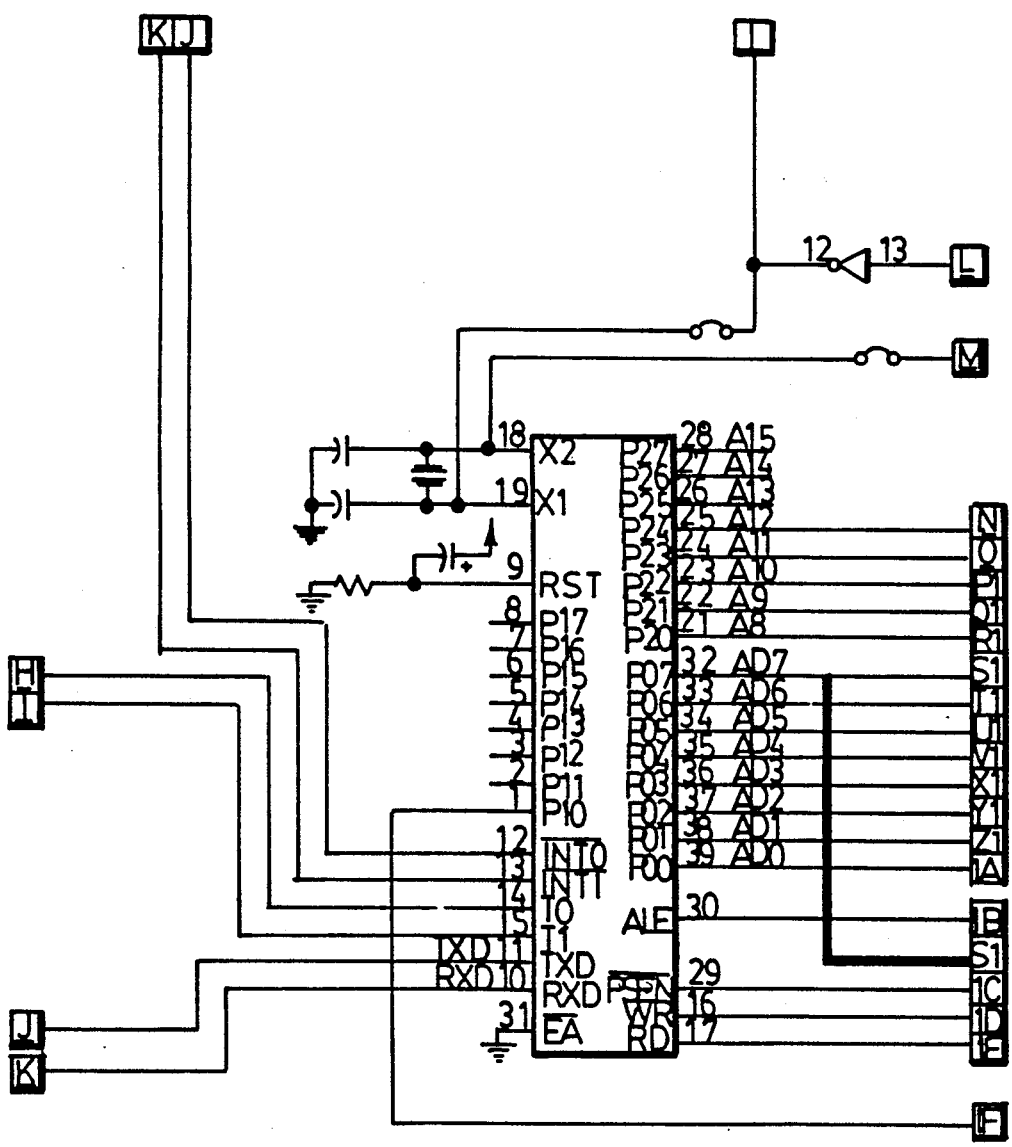
Figure 14J:
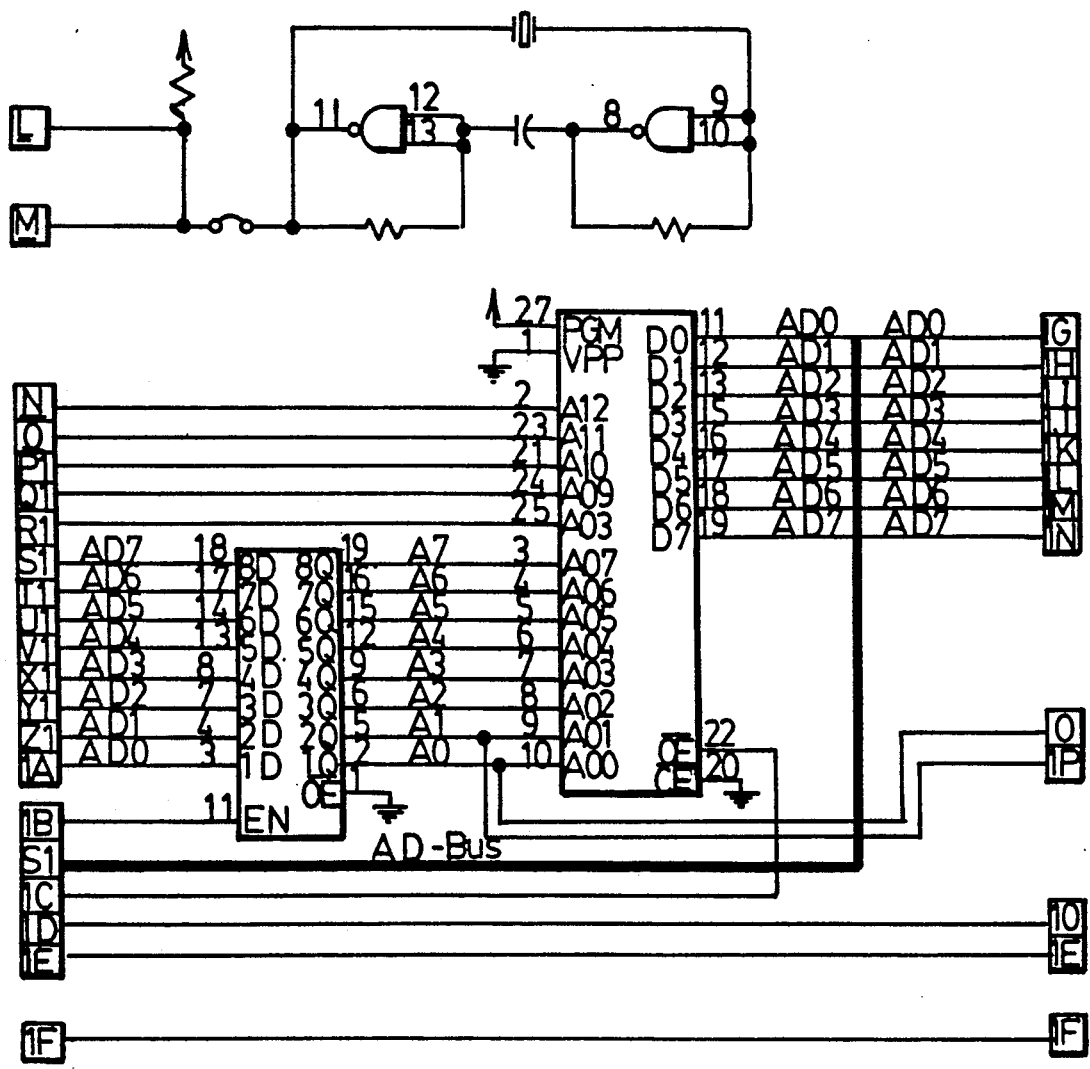
Figure 14K:
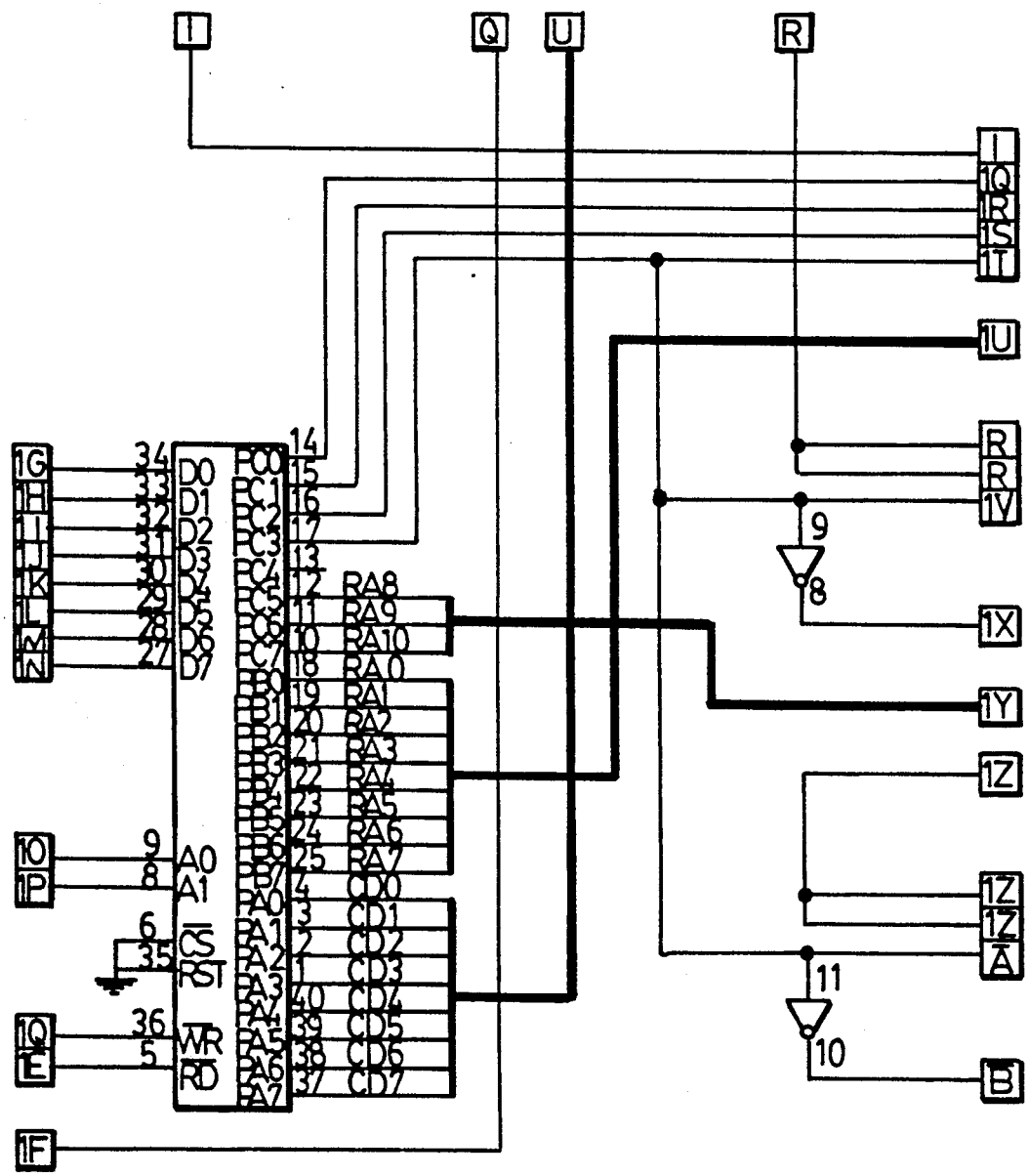
Figure 141:
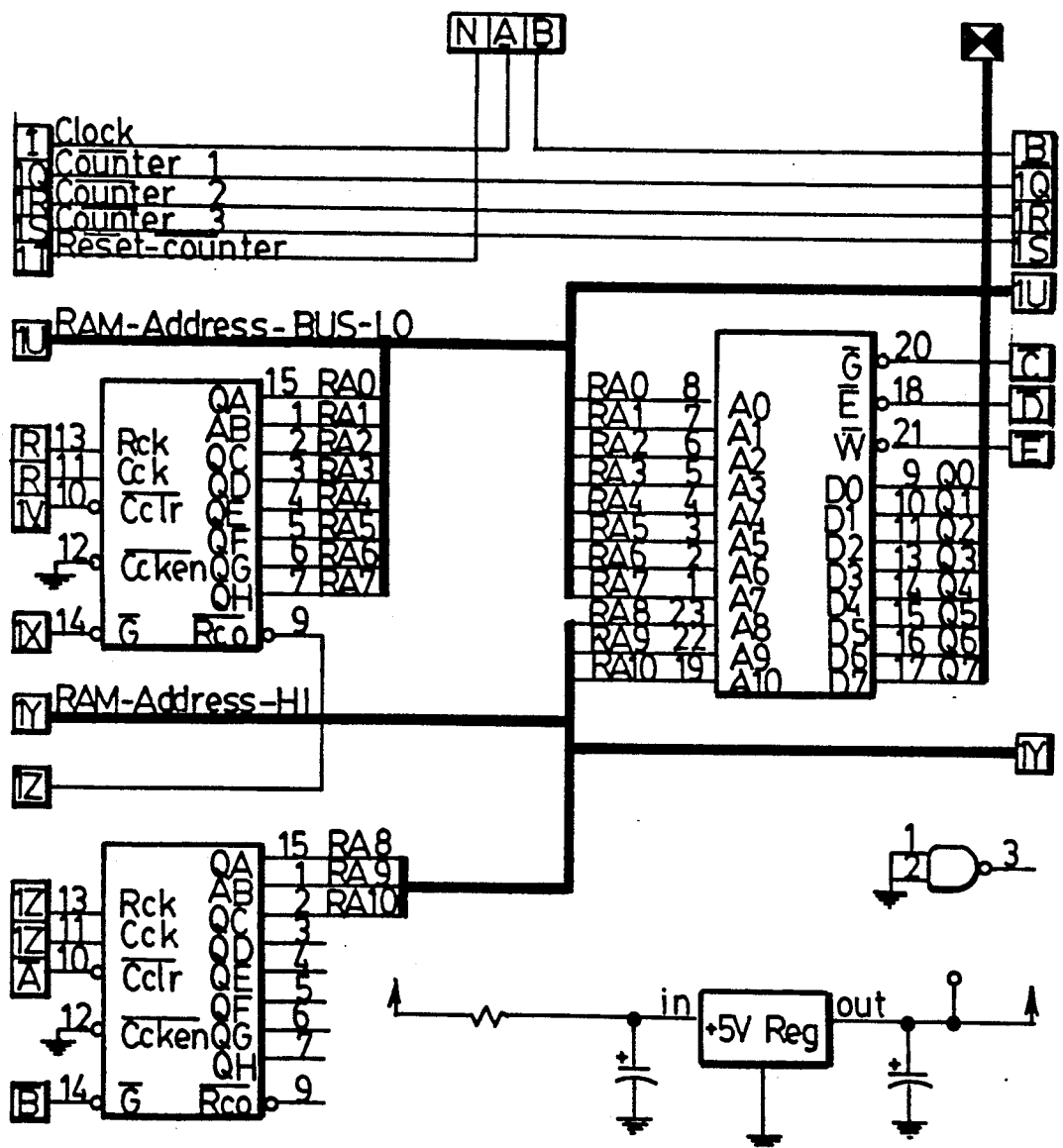
Figure 14M:
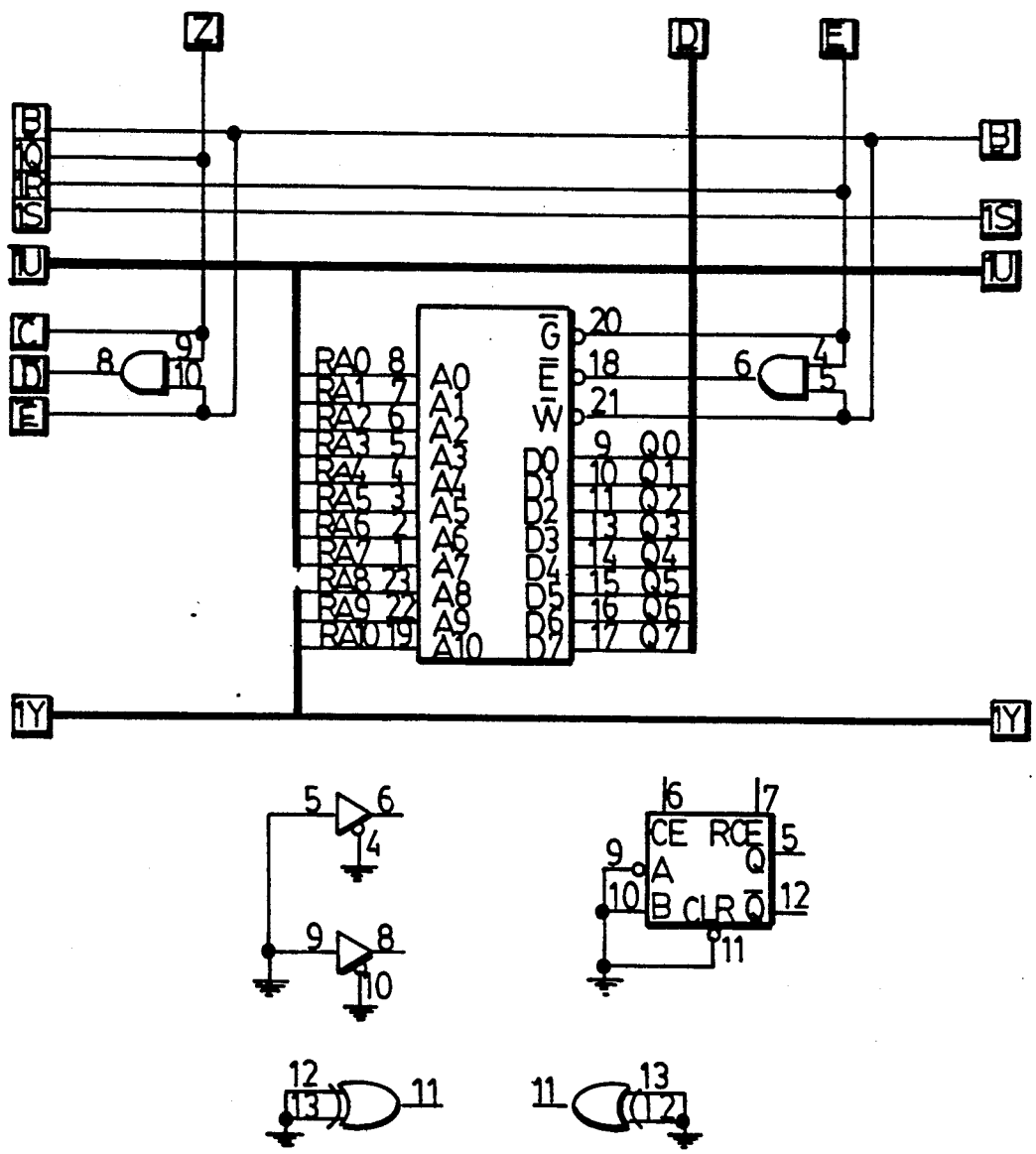
Figure 14N:
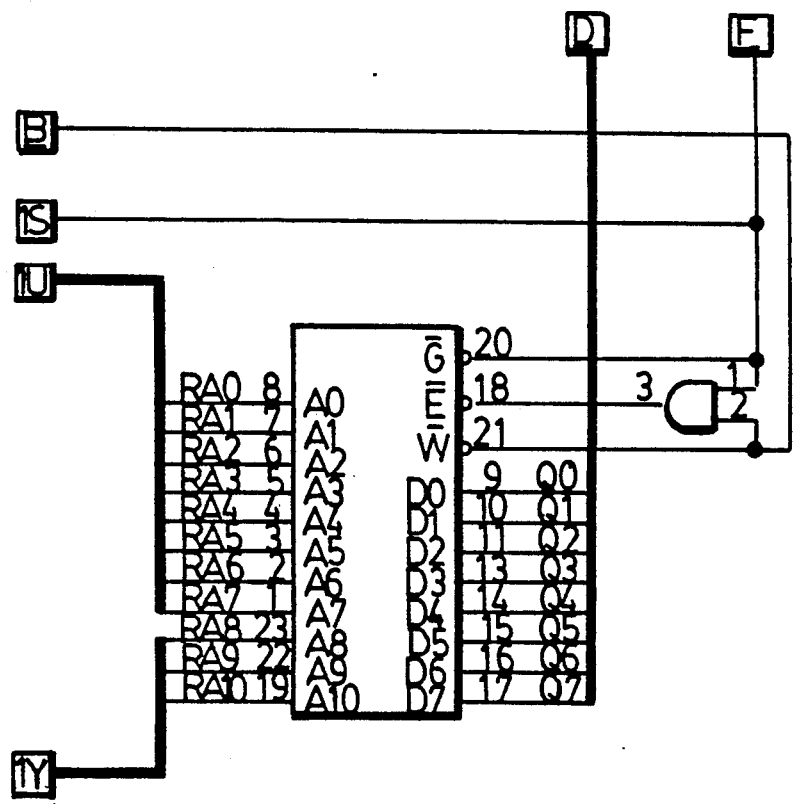

Referring now to FIGS. 13a and 13b, a generalized block diagram of the electronics 88 of FIG. 1 is shown. The corresponding detailed circuit diagrams are shown in FIGS. 14 and 15 (14a–n and 15a–b as shown on the figure summary sheet). In lieu of describing the invention's operation with respect to the detailed circuit diagrams, the following description will proceed with respect to the generalized block diagram of FIG. 13. The block diagram is split into two portions, one for each mirror assembly 47 and 49 (corresponding to Side 1 and Side 2 as indicated in the Figures). This description will only discuss one side, as the circuitry is the same for both. As both laser beams 18 and 20 scan a complete revolution, the laser light that is reflected from each of the various reflective portions of each of the various coded targets 12 or 24 is focused by lens 80 (shown in FIG. 3) and passed through an optical bandpass filter 82 which only allows the passage of light of wavelength 632.8 nm. As mentioned above, this filter reduces the interference effects of the two laser beams, and reduces the negative effects of the ambient light. The filtered light strikes a photo diode (detector 84) and creates a current that is proportional to the intensity of the light. This signal is amplified and converted to digital logic levels at 144 and sent to the rest of the circuit as signal 1.

Stripe 51 on the rotating mirror mount 42 is detected by optical sensor 50. Sensor output (Sync) indicated at 146 is a logic pulse that is used to mark the beginning of each complete rotation, and to determine if the motors are rotating properly. If either of the motors stop rotating or slow down by a predetermined amount, the laser beam is turned off. Motor sync pulse 146 is fed to the scan-gate circuit 148 which uses pulse 146 to generate a pulse that is the length of one complete revolution of the scanning motors 40. This microprocessor provided the reset pulse each time a measurement is to be made (this is determined by input from the operator). The scan-gate pulse is used to gate the incoming reflected light pulses into the edge detector circuit. This input to the edge detector circuit 150 from 148 is shown at 152. Both scan-gate circuits outputs are OR'ed together at 154 to provide a scan-length pulse 156 that is used to enable the Counter-Memory circuit 158. The scan-length pulse 156 is also monitored by the microprocessor to determine when both scans are finished. The edge detector circuit 150 produces a short pulse for each high-low and each low-high transition of the signal pulses. These transitions correspond to the edges of the reflective and non-reflective areas of the targets scanned by the laser beam. The edge pulses are sent to the edge stretcher circuit 160, which lengthens each edge pulse and sends it to the Counter-Memory circuit 158 where it is used to identify which side produced the pulse, shown respectively for Side 1 and Side 2 at 162 and 164. The edge pulses of Side 1 and Side 2 are also OR'ed together at 166 and sent to the Counter-Memory circuit 158 at 168.

The Counter-Memory circuit 158 is a 22 bit counter that can store 2048 24 bit values and which is reset at the beginning of each 360 measurement scan. The counter counts an 11 MHz oscillator, although higher frequency oscillators could be used. Each signal edge pulse causes the current counter value to be stored in 24 bit memory. The stretched side-identification pulse 162 or 164 is stored in memory bits 22 and 23. Three values are stored for the ABSOLUTE ZERO and RELATIVE ZERO measurements, six values are stored for each target, and one value is stored for the variable ONE.-REV which signifies the end of a 360 scan. For 36 targets this only uses 220 of the 2048 memory addresses available; memory remains for additional targets, and if necessary a larger counter may be used.

The microprocessor controller circuit 170 receives and transmits serial RS-232C data with the main computer 171 via the serial data I/O line 172 and 174 (carried inside bundle 86). Once a 360 measurement scan is completed, the values stored in the Counter-Memory circuit 158 are transmitted to the computer for processing, where the actual spatial positions of all manufacturer-provided data points 126 are determined and displayed on a monitor together with the normal spatial positions of those same points. Controller circuit 170 also produces the pulse that resets the scan-gate generator 148 and the 22 bit counter 158 at the start of each measurement scan. Controller circuit 170 also monitors the scan so that the data may be sent to the computer for processing as soon as the scan is completed. Controller circuit 170 is also responsible for monitoring the motor sync pulses 50. If either of the motors stop rotating or slow down, the laser beam generator 56 is turned off to protect people from viewing the laser beam directly. The controller circuit 70 also synchronizes the phase of the motors 40 when the system is powered up. The motors will stay in phase until power is shut off. The phase of the motors is not critical to the operation of the system, and need only be approximately synchronous to function properly.

Figure 16A:
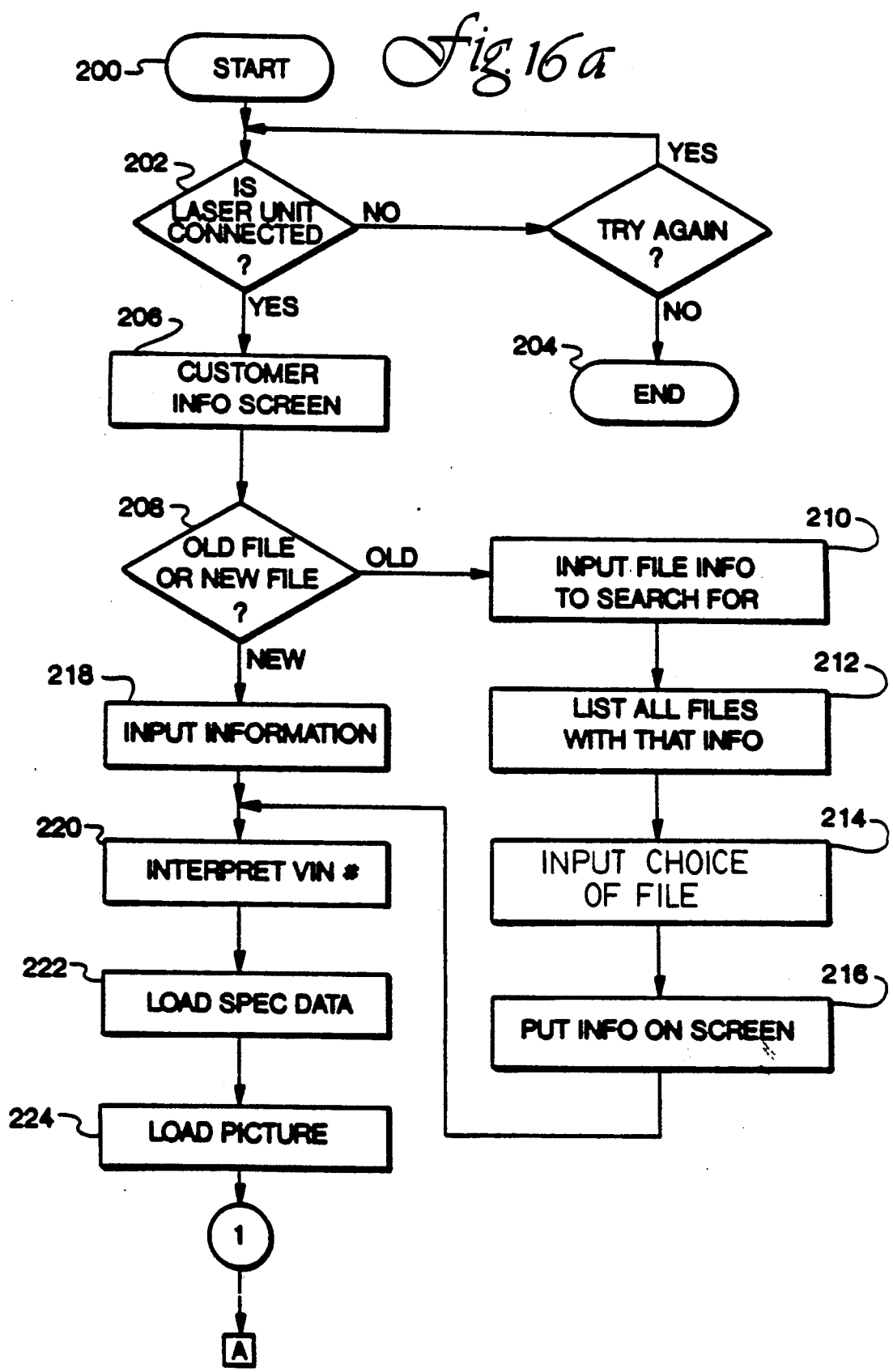
Figure 16B:
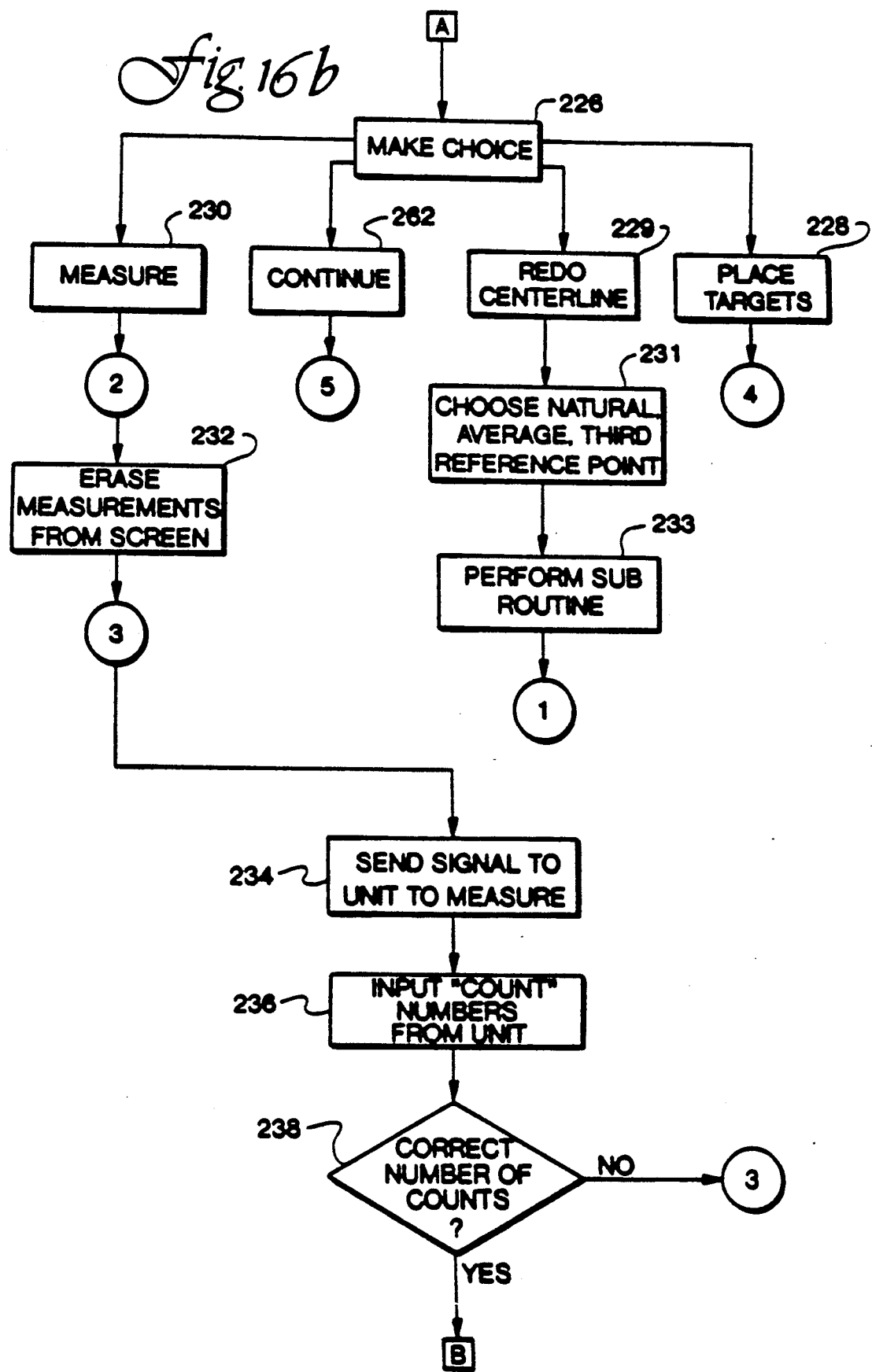

Referring now to FIG. 16, a flow chart of the program contained in appendixes I–III is shown. Appendix I contains the source code for the main driving program and is written in BASIC, although this program may be ported to any number of languages and run on any type of processor. Appendix II contains the source code for displaying the graphic of the vehicle body with the actual and normal coordinates shown in different colors (see FIG. 18). Appendix III contains the source code for printing the screen shown in FIG. 18 so that a permanent record may be made of the display. In lieu of describing the programs operation on a source code basis, the following description will proceed with respect to the flow chart of FIG. 16.

Referring now to FIGS. 16–18, the start of the program is shown at 200. The program may be run on any computer, but in the preferred embodiment, an IBM AT compatible is to be used (not shown). The program checks to verify that the vehicle straightener measuring unit 16 (laser unit) is connected at 202. If after a predetermined number of checks the unit is not connected, the program terminates at 204. The program next requires the operator to complete the screen shown in FIG. 17 at 206 where various billing information and vehicle information is entered at 218 as exemplified by FIG. 17. If the customer is a repeat customer, the program will display the car information entered previously, shown in blocks 208–216. The operator then enters the Vehicle Identification Number or VIN at 220 (each vehicle has a unique VIN). The computer decodes the VIN and displays the rest of the vehicle information shown in FIG. 17 at 222, except the license number, which is entered by the operator. The computer contains a database of specification displays for every vehicle model. The specification for the particular model is accessed using the decoded VIN, and displayed on the screen at 224, as exemplified in FIG. 18. Block 226 represents a menu where the operator next chooses what operation to perform. The operator by now has attached all the targets to the various points on the vehicle to be measured. The operator must pick three of the targets to define a reference plane. This operation is shown in subroutine number 4 shown at 228. This consists of inputting the target number, moving the cursor to the correct location on the screen via the cursor control keys or with a mouse, and assigning that target number to the point on the screen by striking the enter key. The operator tries to pick three targets located on a relatively undamaged portion of the vehicle. The positions of the other targets are computed relative to this reference plane. If all points on the vehicle are damaged, then any three points may be picked. The calculation is performed, the vehicle is straightened, three different points are chosen, the calculation is performed, and the vehicle is straightened again. Eventually, by repeating these steps several times, the entire vehicle is brought back into specification. Of course, it is extremely rare to find a vehicle damaged to such an extent. Normally, three undamaged points may be found to use as reference points.

The ReDo CenterLine option of menu 226 is shown at 229. A reference center line is determined at 231 by one of three methods (Natural, Average, or Third Reference Point), a subroutine is run at 233 to calculate the Centerline. This is used as a reference point for the "X" or width distance shown in FIG. 18. This menu option allows the user to fine tune the determination of this centerline.

The measurement option of menu 226 is shown at 230. The screen is blanked at 232 and a signal is sent to the unit 16 controller 170 to start the measurement process. The laser beams have been continuously scanning a 360° circle, but no measurements have been taken. The counter is reset as discussed above. At the start of the next rotation, all of the COUNTS discussed above are stored in the counter 158. These steps are shown at 234 and 236. The controller 170 sends the COUNTS information back to the computer and the program checks to see if there are enough counts (3 before the first target, 6 per target and one at the end of the 360 scan) at 238. If the number of COUNTS is wrong, the measurement is redone. The numbers are then converted into decimal, the six COUNTS per target are separated out and the target number, height, ANGLE1, and ANGLE2 are determined by the formulas discussed above. These steps are shown in blocks 240-246. The program next verifies that both laser beams have data for the same target numbers, at 248. This insures that all the targets are oriented within the 30 range with respect to both laser beams as discussed above. The program at 250 next calculates the (X,Y,Z) coordinates of each target with respect to the unit 16. The program then rotates these coordinates into the coordinate system defined by the manufacturer provide data at 252. The program then attempts to "fit" the actual coordinates of the reference hole with the manufacturer-provided reference hole data, at 254. If the actual coordinates are within a certain distance of the position of the closest manufacturer reference hole as defined by the data, then the program knows that it is comparing the correct two points. Blocks 256-260 show that the program is updating the screen shown in FIG. 18 with the target number shown at the correct location (calculated at 254) with the specification (normal) value shown in one color and the actual value shown in another color. The screen shown in FIG. 18 will be more fully described below.

The operator now performs straightening on the vehicle with methods well known in the art. The measurements are retaken by selecting the measure option 230 at 226. When the normal values match the actual values (within a predetermined amount of error) then the car has been straightened. The operator may now choose Continue at 226 which performs the subroutine numbered 5 shown at 262. This routine allows the operator to print a copy of FIG. 18 for the customers file, save the information to a customer file and prepare an invoice.

Subroutine number 6 shown at 264 allows the user to more closely monitor a particular portion of the vehicle. This allows the user to straighten a particular portion of the vehicle, measure, view the updated screen to see the effects of the straightening, and repeat if necessary.

Referring now to FIG. 18 a sample screen showing the actual spatial positions of the reference holes, and also compares them to the specification or normal spatial positions. Eight targets 12 are shown in FIG. 18, however, any number of targets may be used. Only targets 11 and 12 are discussed here since all that is said applies to the other targets. Targets 11 and 12 are shown on FIG. 18 at 300 and 302. The two numbers shown at 304 and 306 correspond to the measurement in millimeters of the width of "X" coordinate of the data point 126 corresponding to target 11 as measured from the centerline 308, calculated above. The number shown at 304 is displayed in one color and corresponds to the "normal" or "specification" value as provided by the manufacturer. The number shown at 306 is the "actual" width value as measured by the unit 16. The numbers shown at 310 represent the width deviation for target 12. Similarly, the "Z" or height, both actual and specification, is shown for targets 11 and 12 at 312 and 314 respectively. This represents the distance from the data point to the Z=0 plane as calculated above. The length or "Y" coordinate for targets 11 and 12 are shown at 316 and 318 respectively. The Y=0 point is shown at 320.

The operation of the program of Appendixes I-III is now described. Appendix IV is a source code for an alternate, preferred program which functions with minor variations in substantially the same manner as the program of Appendix I.

The foregoing completes the description of the preferred embodiments of FIGS. 1-18.

The Embodiments of FIGS. 19-34

Referring to FIGS. 19-34, additional, commerically preferred embodiments of the invention include the following: a vehicle straightener measuring unit 1016, shown in FIGS. 19-20, coded targets 1012, shown in FIGS. 21-22, target positioning clips 1112, 1412, shown in FIGS. 23-25, and a mechanical transfer system using a measuring assembly 1522, shown in FIGS. 26-34.

The commercially preferred vehicle straightener measuring unit 1016 includes two laser generators 1056, 1057, not one generator 56 as in measuring unit 16. The laser generators 1056, 1057 are mounted to revolve with their associated mirrors 1046, 1048, referenced in FIG. 20, rather than remain stationary, as does generator 56 of unit 16.

Referring to FIGS. 19-20, each laser generator 1056, 1057 includes a rotary transformer 1426, an electronic laser power circuit 1414, on a circuit board, a laser diode power supply 1416, a laser lens mount 1418, and a laser and focusing lens assembly 1420, all as referenced in FIG. 20. Referring especially to FIGS. 19A, 19B, these components of each generator are mounted on a cylindrical, aluminum hub 1422 for rotation with the hub 1422. Also mounted on the hubs 1422 are the mirrors 1046, 1048, filters 1059 and hub cover assemblies 1055.

The surfaces of the mirrors 1046, 1048 are angled at 45° to the plane defined by the laser beams 1018, 1020, as shown in FIGS. 19A, 20. As in FIG. 19A, each mirror 1046, 1048 and its mount define a mirror opening 1021 for a laser beam to pass through the mirror when exiting the laser. Each mirror 1046, 1048 then reflects laser light through the filters 1059 returning, as in FIG. 19B.

A DC brushless motor 1424 below the rotary transformer 1426, as shown in FIG. 19 rotates the hub and all the laser components mounted on the hub at a constant rpm. The rotary transformer 1426 comprises a lower disk with wire windings to which electrical current is supplied, and an upper disk with wire windings in which an electrical current is induced. The induced current powers the associated laser.

As each motor 1424 spins a laser generator, each laser beam 1018, 1020 sweeps in a 360° arc. Both beams are directed in a single plane. When a beam such as 1018 strikes a target, the beam is reflected back to the laser assembly, where the divergent beam is reflected by a mirror such as 1046 to a focusing lens 1063, shown in FIG. 19. The focusing lens 1063 focuses the beam onto a photo diode sensor 1065. The signal from the photo diode sensor is amplified and input to the electronics 88. A magnet 1428, in FIG. 19A, is affixed to the bottom of each hub, and is sensed by a magnetic sensor (e.g., a magnetic tachometer) 1430 for accurate determination of the beginning and ending of scan cycles. The magnetic sensor 1430 is coupled to the electronics 88.

Referring to FIGS. 21, 21A and 22, the targets 1012 vary from the targets 12 in FIGS. 5 and 6 by a reversal of reflective and non-reflective areas and the inclusion of two narrow, reflective areas 1023, 1025 parallel to the physical, vertical edges of the target. As in FIG. 22, the areas 1023, 1025 result in a signal varied from the signal of targets 12, as in FIG. 12. The reversal and the additional areas 1023, 1025 provide a refined signal, for improved accuracy.

Referring to FIGS. 23–25, the target positioning clips 1112, 1412 vary from the clips 112. The clips 1112, 1412 receive a spherical ball 1431 which tops each target 1012, eliminating target screws 110 mentioned in relation to targets 12. Clip 1112 mounts in a reference hole in generally vertical body panels. A brace portion 1432 of the clip 1112 abuts the back side of the body panel, countering the weight of a suspended target. Clip 1412 mounts in a reference hole in a generally horizontal body panel. Clip 1412 is a spring clip, with two helical springs 1434, 1436 on elongated rod portions 1438, 1440 of a ball receptor 1442. The rod portions 1438, 1440 extend through openings in the body 1444 of the clip. The body 1444 flexes inward to fit flanges 1446, 1448 through a reference hole of a body panel 1435, while springs 1434, 1436 flex the body 1444 outward to retain the clip 1412 in the hole under spring tension.

Figure 26:
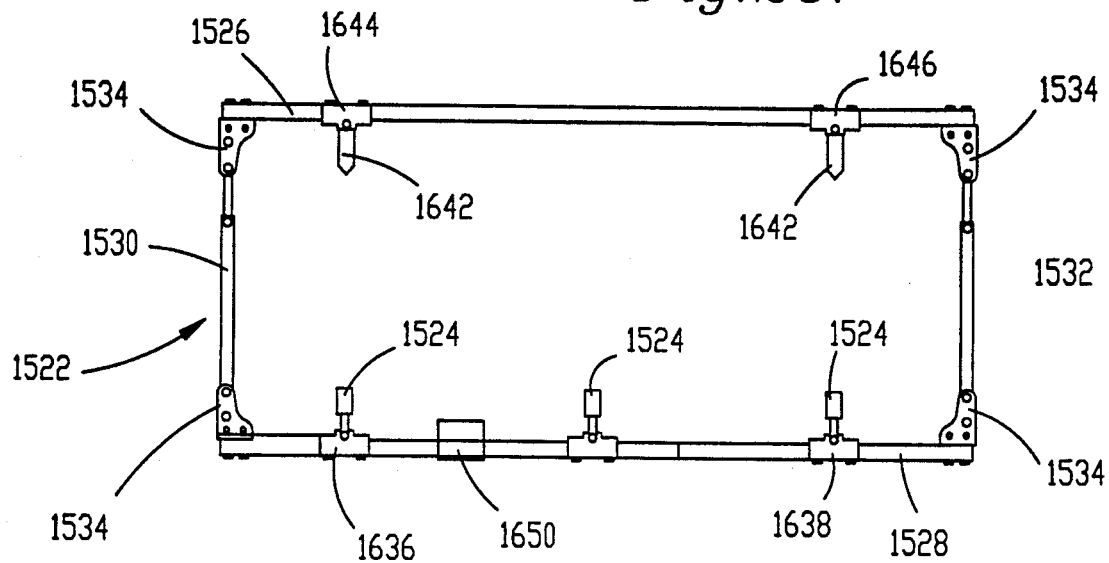
FIG. 26 is an elevation view of a strut gauge of the invention, shown also in FIG. 1.
Figure 27:
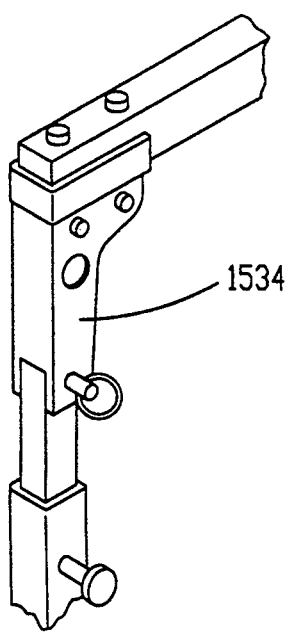
FIG. 27 is a fragmentary perspective detail of the strut gauge of FIG. 26.

For orientation to the following description, note is made that FIG. 11 includes a mechanical transfer system 22 in relation to the first preferred embodiment. As shown in FIG. 26, a second embodiment of the mechanical transfer system includes a measuring assembly 1522 and standing coded targets 1524, to transfer the coordinate information of points such as point 128, shown in FIG. 11, to the laser unit 16 or 1016. In the second embodiment, the coordinate information of two points directly above the strut towers of an automobile is transferred.

Referring to FIG. 26, the measuring assembly 1522 includes four bars positioned with corner brackets 1534 in a parallelogram shape. An upper bar 1526 of the assembly 1522 is fitted with positionable pointers 1642. The pointers 1642 support the measuring assembly 1522 on vehicle reference points, such as those located atop vehicle strut towers. Two side bars 1530, 1532 are telescoping, for vertical adjustment of the location of a lower bar 1528. Standing coded targets 1524 are located on the lower bar 1528. The measuring assembly 1522 is positioned as is the system 22 in FIG. 1, to locate the targets 1524 in position to be scanned by laser beams 1018, 1020, as targets 24 are scanned by beams 18, 20 as in FIG. 1.

The lower bar 1528 is a rigid longitudinal member, preferably made of aluminum or a similar lightweight high-strength material. The lower bar 1528 and the upper bar 1526 are similar in length and overall construction. They function with side bars 1530, 1532 to provide support for various devices, and to provide an x-y-z frame of reference. Three of the coded standing targets 1524 are located on the lower bar 1528. The center target is locked into a center position and is not moved when taking measurements. The left and right targets are movable.

Figure 33:
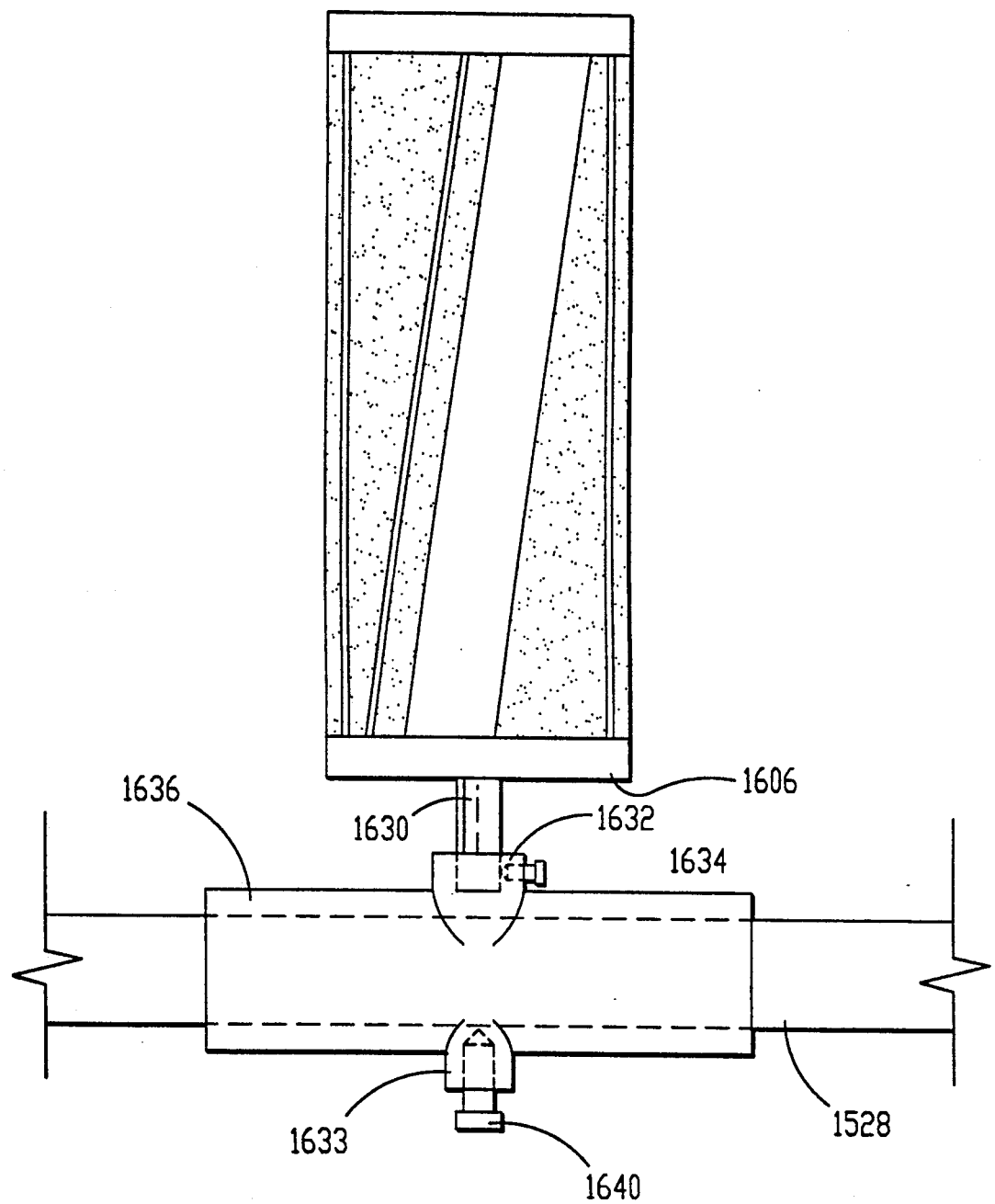
FIG. 33 is an elevation view of a fragment of the lower bar of the strut gauge.

The following description applies equally to all targets 1524, with one target shown in FIG. 33. A target 1524 is supported on a standing rod 1630, which is mounted on a longitudinally slidable base member 1636. The base member is fixed in position to the lower bar 1528 by a thumb screw 1640 in a collar 1633. The standing rod 1630 is fixed to the base member 1636 with a thumb screw 1634 in a collar 1632. The standing rod 1630 rotates within collar 1632 upon loosening of the thumb screw 1634, for adjustment of the direction in which the target faces. The lower bar 1528 is figuratively split by the center target, constraining the left and right targets to their respective halves.

The upper bar 1526 is fitted with indexing means, allowing measurement of the longitudinal position of the pointers 1642 on the upper bar 1526. The indexing means may be such means as known to those of skill in such matters. In the second embodiment, the indexing means comprises an optical ruler and associated electronic circuitry for processing signals from the optical ruler.

Two sensors 1644, 1646 are attached to the pointers 1642 and move in a unit with them. The sensors read the longitudinal position of the pointers on the optical ruler. This information is output to the electronics 88 of the laser unit 1016. Communication with the laser unit 1016 may be by any means known to those in the electronic communication arts; in the second embodiment, communication occurs over an infra-red datalink, as will be described.

Figure 28:
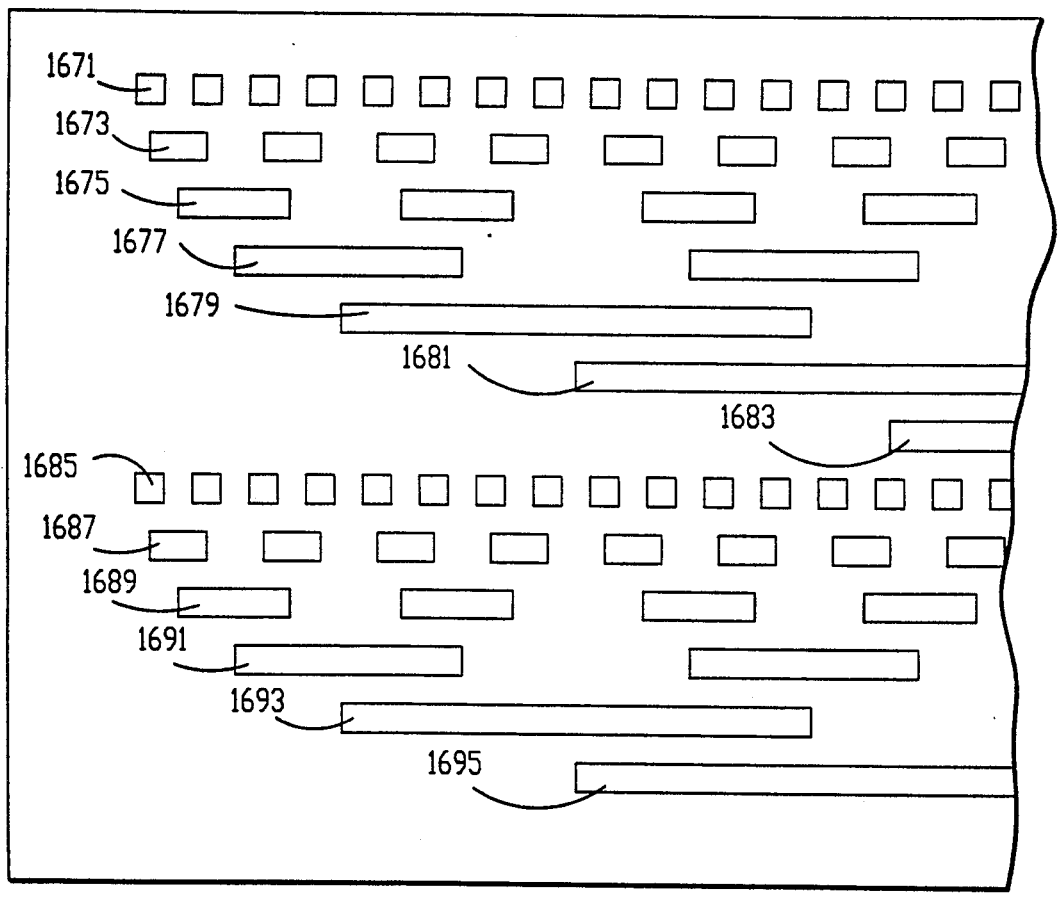
FIG. 28 is a fragmentary plan view of the upper bar of the strut gauge.
Figure 29:
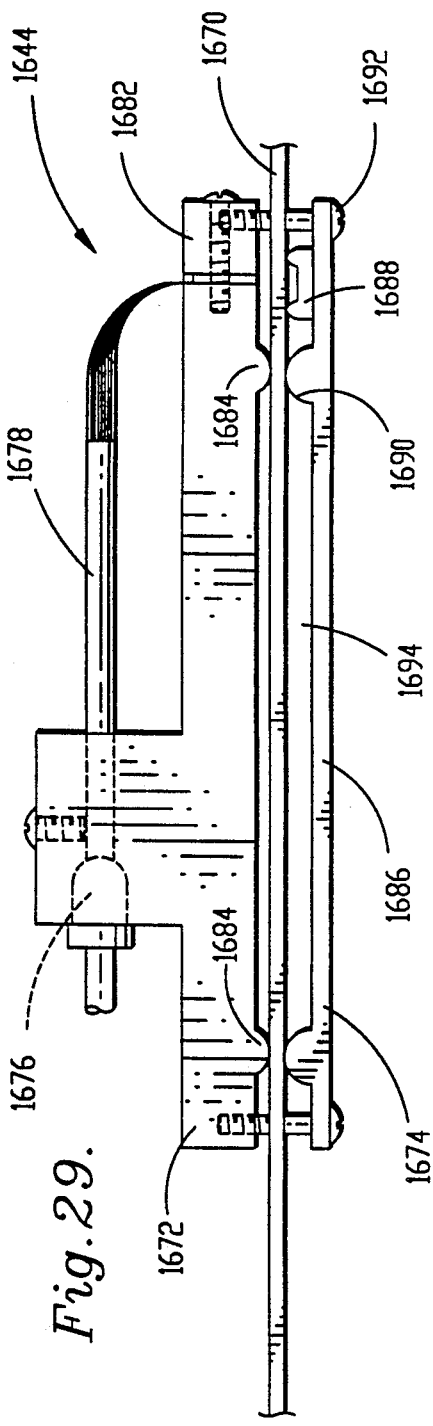
FIG. 29 is a side elevation view of an optical measuring device of the strut gauge, on a fragment of the upper bar of the strut gauge.
Figure 30:
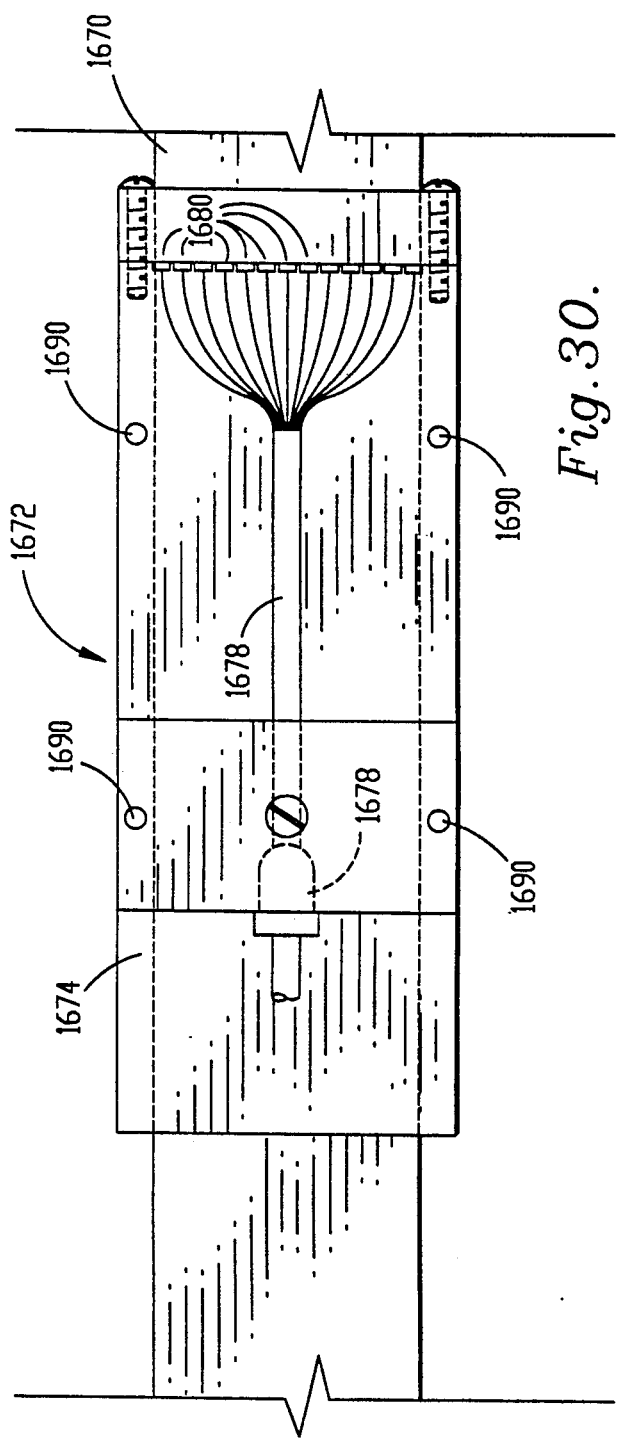
FIG. 30 is a plan view of the optical measuring device and bar fragment of FIG. 29.
Figure 31:
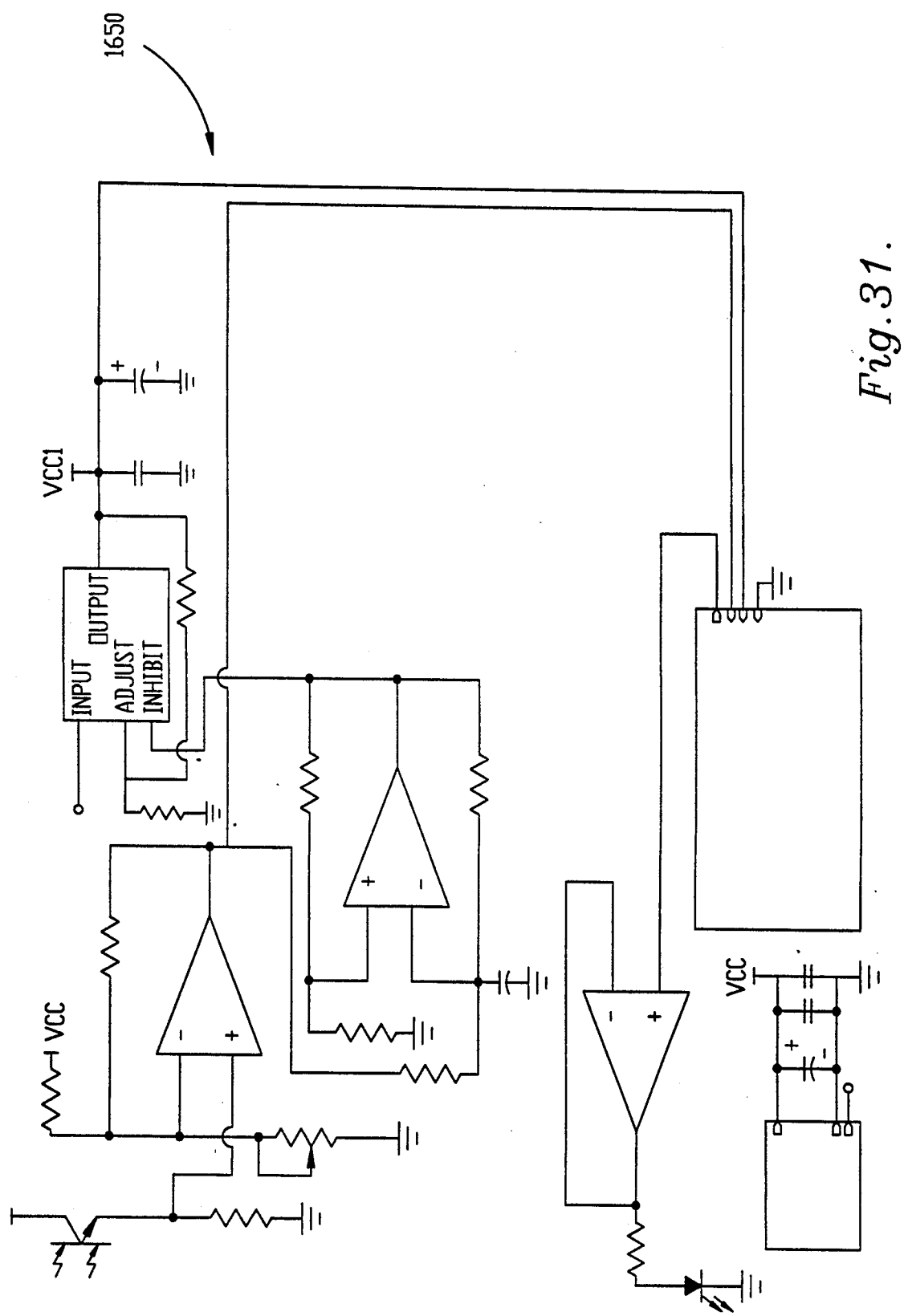
FIG. 31 is a circuit diagram of the electronics of an infrared datalink of the optical measuring device.
Figure 32:
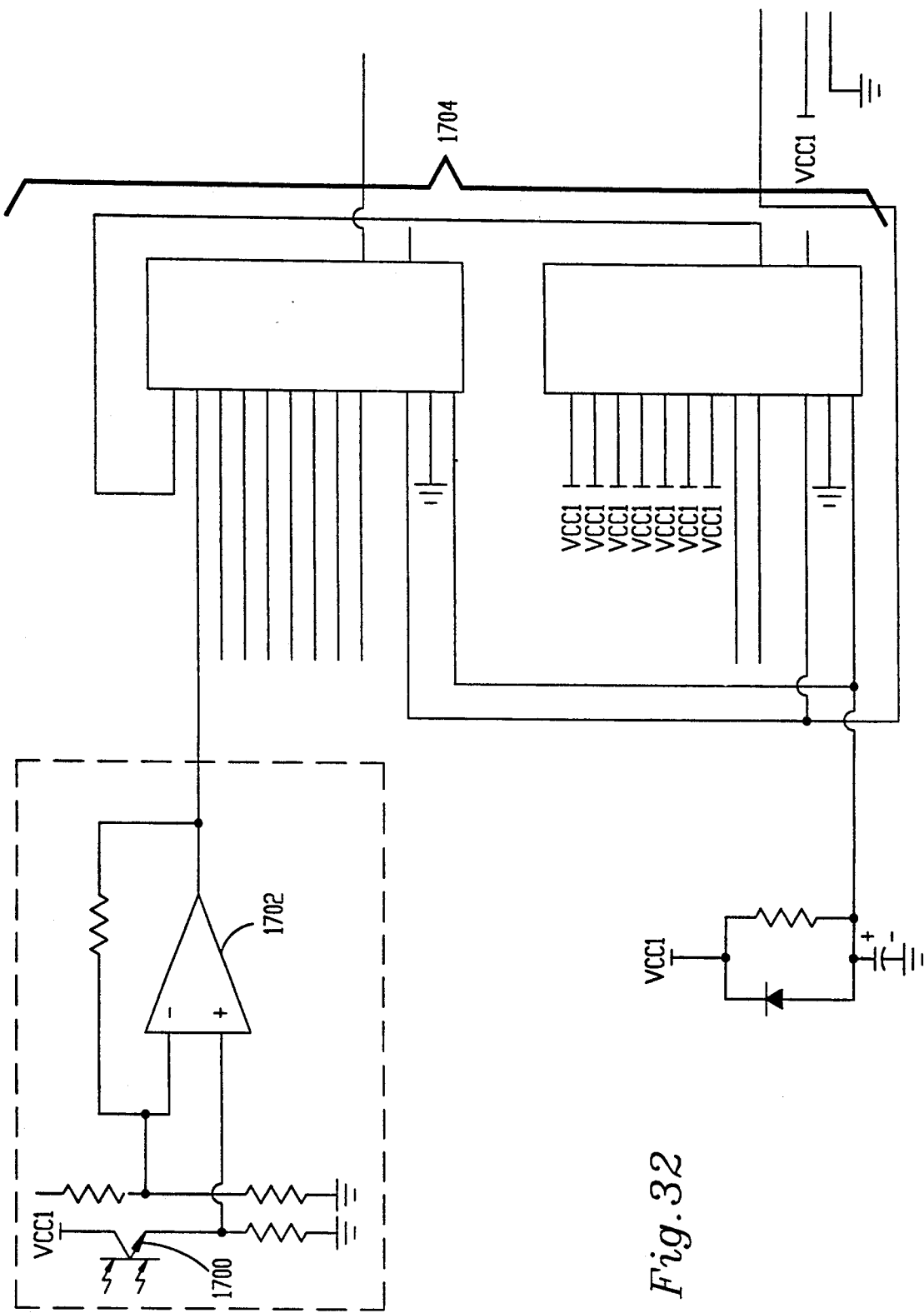
FIG. 32 is a circuit diagram of the electronics of a signal processing unit of the optical measuring device.

The left and right sensors 1644, 1646 are slidably mounted in association with an optical ruler 1670, depicted in FIGS. 29 and 30. The sensors 1644, 1646 are rigidly attached to the pointers 1642, such that when the pointers are positioned, the sensors read longitudinal position from the optical ruler 1670. Referring specifically to FIG. 28, the optical ruler 1670 is comprised of a substantially flat member. The member is scored through with a plurality of evenly-spaced perforations which are organized longitudinally into channels, depicted individually as 1671–1695. The perforations are transparent to incident radiation directed from a fiber optic bundle 1678, depicted in FIGS. 29 and 30. In an individual channel, the perforations are equally spaced apart from one another. The spaces between the perforations are impermeable to the radiation emitted from the fiber optic bundle 1678. In the embodiment of FIGS. 28–30, there are thirteen channels, in two codes. Each channel represents a binary representation of a bit that codes for a particular longitudinal position on the ruler 1670. Channels 1671 and 1695 represent the least significant bits of the two codes. As shown in FIG. 28, channels 1683, 1695 represent the most significant bit of the codes.

More particularly and with reference to FIGS. 26, 29, and 30, and with reference to left sensor 1644, a sensor is comprised principally of two parts, an emitter 1672 and a detector 1674. The emitter 1672 is comprised of a light source 1676, located within the body of the emitter 1672, a bundle of optical fibers 1678 for conveying individual sources of light, and fiber positioners 1680. Individual fiber positioners 1680 are provided upon emitter 1672 to grasp each fiber end and direct it perpendicularly towards the surface of the optical ruler 1670. It will be understood by one of average skill that optical fibers are a suitable material for constructing the fibers. Additionally, other equivalent means for creating individual light sources and directing them towards the surface of the optical ruler are included within the scope of the embodiments of FIGS. 19-34.

The detector assembly 1674 is positioned on the opposite side of the optical ruler 1670, and mounted to the emitter assembly 1672, such that both move in tandem longitudinally on either side of the optical ruler 1670. The detector assembly 1674 comprises a housing 1686 in which various components are housed. The first component is the sensor phototransistor array 1688. Array 1688 is a group of electronic transducers that convert incident radiation to photoelectrical signals. At least one transducer exists for each optical fiber. The transducers are mounted laterally relative to the optical ruler 1670.

The transducers are commercially available, silicon-based phototransistors and photo diodes. Typically, a device such as the OPC 308V, manufactured by Optek, may be used. Wires are provided for conducting the photoelectrical signals to the signal processing unit 1694.

Means for holding the two sub-units, the emitter assembly 1672, and the detector assembly 1674, are provided in retaining springs 1684 and 1690, and retaining screws 1692. Screws 1692 are the primary means for holding the two assemblies in fixed relation to one another, while the retaining springs 1684, 1690 resiliently hold the two sub-assemblies apart from the surface of optical ruler 1670.

The signal processing unit 1694 accepts electrical inputs from the detector array 1688. The signal processing unit 1694 is shown schematically in FIG. 32. Electrical signals from a phototransistor 1700 are amplified by a differential amplifier 1702, then output to a parallel-to-serial shift register 1704. Output from the shift register 1704 is directed to the infra-red datalink 1650 at 5 kHz frequency. The circuit within the dashed outline, including the phototransistor 1700 and differential amplifier 1702 is repeated for each channel of the optical ruler.

The sensors 1644, 1646 measure the distance from the center of the upper bar 1526 to the pointers 1642. This distance represents the sensor's x-component, and is input to the computer from the laser unit. The perforation pattern along the optical ruler 1670 is comprised of a 7 bit Gray Code with a 6 bit distance 3 Gray Code. This combination allows a unique binary 13 bit number for each half millimeter step along the ruler.

Behind the ruler 1670 is the photo sensor array, with a corresponding photo sensor for each of the thirteen sources. The photo sensor detects the presence or absence of light from the corresponding source. If light is detected, this is interpreted as a logical 1, and if no light is detected, this situation is interpreted as a logical 0. In this manner, the sensor array provides the unique 13-bit number for each half millimeter on the ruler 1670. The bit combination read by the photo sensor array is transmitted to the computer via an infra-red datalink 1650.

Operation of the measuring unit is accomplished in the following manner. The two pointers 1642 are adjusted to rest upon two critical reference points of the vehicle body. The side bars 1530, 1532 are telescoped to allow the standing coded targets 1524 on the lower bar 1528 to reflect laser beams 1018, 1020.

The laser unit 1016 scans the three targets 1524 and determine their x,y,z coordinates as disclosed earlier. The center of the upper bar 1526 is directly over the center of the lower bar 1528. That is, the top and bottom bars are located in parallel x,y planes, and thus all points along one bar have substantially the same x,y coordinates as points along the other bar.

Of the three targets 1524, one is fixed at the center of the lower bar, and the other two are slidable along the lengths of their respective halves. These two are movable to allow flexibility of adjustment, needed when beam-blocking impediments are encountered. In a manner previously described, the coordinates of the three targets are known by the measurements of the laser unit 1016. The x-y coordinates of the center of the upper bar are known by the coordinates of the fixed center target on the lower bar. Any angle of the measuring device with respect to the x-axis is calculated from the x,y coordinates of the two movable targets on the lower bar.

Next, the sensors 1644, 1646 measure the distances of each pointer 1642 from the center of the upper bar, whose coordinates are known. The difference between the measurements of the locations of one pointer and the corresponding lower target can be used to adjust to x,y coordinates of the pointer to display the location of the pointer.

Figure 34:
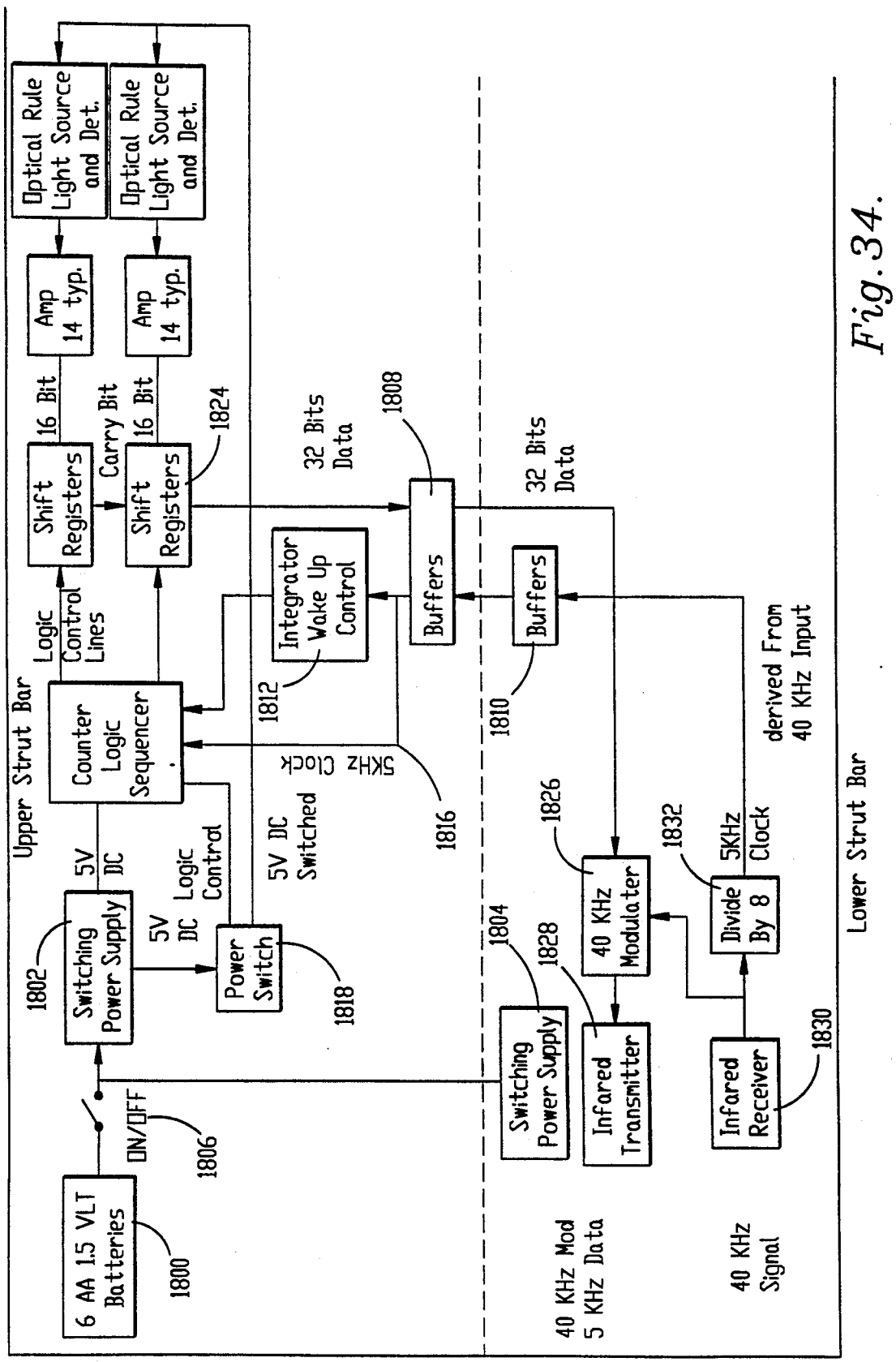
FIG. 34 is a schematic of the strut gauge electronics.

Referring to FIG. 34, the electronic componentry of the strut measuring assembly 1522 includes a battery pack 1800 of six AA batteries that supply power to an upper strut switching power supply 1802 and a lower strut switching power supply 1804. A manual switch 1806 controls connection of the battery pack to the power supplies. The upper strut switching power supply 1802 is a high efficiency 40 Khz supply, which receives 9 volts DC from the battery pack, operates in the "buck" mode and regulates the voltage from the battery pack to a reduced, 5 volts DC voltage. The DC voltage, with an AC carrier of approximately 200 millivolts at 40 Khz, acts as a 40 Khz charge pump to a storage system consisting of a steering diode, a capacitor and a filter. The DC voltage with AC carrier charges the capacitor and allows momentary high current discharges from the power supply without degradation of the supply voltage. The switching power supply and storage system also allow the electronic componentry to function in a standby mode while power is applied to the strut and in the absence of a signal at the infrared receiver, extending the battery life.

Interface buffers 1808 include a line driver and receiver interface from a ribbon cable which connects the upper strut electronics to the lower strut electronics. These buffers receive a 5 Khz 50% duty cycle square wave signal from lower strut interface buffers 1810 and transmit to the lower strut electronics 32 bits of start/stop and data that comes from the strut sensors. An integrator 1812 samples the incoming 5 Khz signal to determine if the signal is within 100 hz of the preset value of 5 Khz for the signal. If the signal is within range, a signal is sent to a logic sequencer 1814. The integrator waits 250 milliseconds after receiving a pulse string before resetting itself.

The logic sequencer 1814 remains in a reset mode until it receives a signal from the integrator, at which time the logic sequencer is preloaded with a binary value. On the next rising edge of a "clock in" signal 1816, the logic sequencer begins to count "up". On each successive rising edge of the "clock in" signal, the logic sequencer counts "1" step. On a count of 4, an "inhibit strut" signal to the strut power switch 1818 goes false. On a count of 6, a "load/shift" signal goes "low"; on a count of 7, a "clock out" signal to the strut sensors is enabled; on a count of 8, the "load/shift" signal goes "high"; and on a count of 40, the "clock out" signal to the sensors is disabled and the "inhibit strut" signal goes true. The logic sequencer is reset at this point.

When the "inhibit strut" signal from the logic sequencer goes false, the strut power switch 1818 applies 5 volts DC power to the strut sensors. When the "inhibit strut" signal goes true, the strut power switch removes power from the strut sensors.

When the "load/shift" signal goes "low", the light emitters of the strut sensors are enabled, and when the "load/shift" signal goes "high", the light emitters are disabled. Output current from a photosensor is amplified and sent to the parallel to serial shift registers 1822, 1824 as either a logic "1", meaning the detector is not occluded, or a logic "0", meaning the detector is occluded.

The parallel to serial shift registers accept data from the individual light detector channels and load the data into input latches. While the "load/shift" signal is "low", the shift registers ignore any signal on the "clock out" line from the logic sequencer. When the "load/shift" signal goes "high", the shift registers begin shifting their data on the rising edge of each pulse of the "clock out" signal from the logic sequencer. At this point, any change of data at the inputs of the shift register latches are ignored. The shifted data is 16 bits from one strut sensor to the other strut sensor as a carry, and 32 bits from both strut sensors to the interface buffers 1808.

The second switching power supply 1804 operates as does the first, at 65 Khz. A second storage system operates as does the first, with a storage value of 0.5 Farad. The interface buffers 1810 operate as do the first, with signal directions reversed for the respective signals. A 40 Khz modulator 1826 combines a 40 Khz signal supplied by an infrared detector with the "data in" signal to generate a 40 Khz signal modulated by a 5 Khz bit stream to provide immunity of the data bit stream. The modulated signal received from the 40 Khz modulator is output from the infrared transmitter 1828.

An infrared receiver 1830 is composed of a large area photodiode, a hysteresis comparator, an amplifier and an ambient light filter. An infraredsignal, composed of a 40 Khz 50% duty cycle square wave is received by the receiver with the exclusion of other light radiation wavelengths and modulating frequencies. This 40 Khz signal is sent to the 40 Khz modulator 1826 and also a divider 1832. The divider divides the 40 Khz signal to generate the 5 Khz signal sent to the interface buffers 1810.

Appendix V is a source code for the preferred computer program for the embodiments of FIGS. 19-34, in Turbo C language. "Menusl" begins program operation.

The foregoing completes the description of the embodiments of FIGS. 19-34.

What is claimed is:

1. Apparatus for indicating deformation of a vehicle body or the like, said vehicle body having at least one reference point and a normal position thereof, said apparatus comprising:

at least one target means including a reflective portion, positioned in a predetermined location relative to the reference point on the vehicle body for indicating deformation of the body by the position of the target means relative to said normal position;

means for sweeping a beam of radiation across the reflective portion of the target means, said reflective portion reflecting said beam;

means for receiving radiation reflected from the target means;

means for interpreting the radiation reflected from the target means and for indicating at least the two-dimensional spatial position of the reference point relative to normal position, wherein the target means comprises at least two reflective areas separated by a non-reflective area, wherein width of at least one of the two reflective areas in the direction which the beam sweeps across the target means is indicative of a spatial coordinate of the target means transverse to the sweep of the beam, wherein the target means is rectangular in overall shape having vertical sides defining its width and top and bottom sides defining its height; the reflective areas are positioned to each of the vertical sides respectively and extended substantially between the top and bottom sides of the target means while varying inversely in width over their length between the top and bottom of the target means, wherein the target means further includes an additional reflective area and an additional non-reflective area, said additional areas extending substantially between the top and bottom of the target means, each of said areas being of a predetermined width so that the combination of the additional reflective and non-reflective areas provide a code for uniquely identifying each coded reflective target.

2. Apparatus for indicating deformation of a vehicle body or the like, said vehicle body having at least one reference point and a normal position thereof, said apparatus comprising:

at least one target means including a reflective portion, positioned in a predetermined location relative to the reference point on the vehicle body for indicating deformation of the body by the position of the target means relative to said normal position;

means for sweeping a beam of radiation across the reflective portion of the target means, said reflective portion reflecting said beam;

means for receiving radiation reflected from the target means;

means for interpreting the radiation reflected from the target means and for indicating at least the two-dimensional spatial position of the reference point relative to normal position, wherein the interpreting and indicating means comprises;

counter means for counting a number of interval counts over a sweep of the beam;

computing means for identifying counts during which reflected radiation is received by the receiving means and during which reflected radiation is not received by the receiving means, further including computing means for determining at least the two dimensional position of target points associated with the target means, the computing means further for determining the three dimensional spatial position of the target point, further including an additional reflective area and an additional non-reflective area, each of said additional areas being of a predetermined width such that the combination of the additional reflective and non-reflective areas provide a unique code for uniquely identifying the target.

3. Apparatus for indicating deformation of a vehicle body or the like, said vehicle body having at least one reference point and a normal position thereof, said apparatus comprising:

at least one target means including a reflective portion, positioned in a predetermined location relative to the reference point on the vehicle body for indicating deformation of the body by the position of the target means relative to said normal position thereof;

means for sweeping a plurality of beams of radiation across the reflective portion of the target means; said reflective portion reflecting said beams;

said beam sweeping means comprising radiation means for producing at least two laser beams and means for sweeping each beam through a 360° arc;

means for receiving radiation reflected from the target means; and means for interpreting the radiation reflected from the target means and for indicating at least the two-dimensional spatial position of the target means relative to normal position.

4. The apparatus as in claim 3 wherein the beam sweeping means further includes a reflecting mirror means associated with each beam for receiving and reflecting each beam, whereby each beam sweeps an arc.

5. The apparatus as in claim 4 wherein each reflecting mirror means reflects the beam associated therewith such that each beam sweep an arc of substantially 360°.

6. The apparatus as in claim 4 or claim 91 wherein the reflecting mirror means are mounted and the beams are directed onto the reflecting mirror means such that the reflected beams are substantially co-planar.

7. The apparatus as in claim 3 wherein the beam sweeping means further includes a plurality of radiation means for producing at least two laser beams, and a plurality of rotatable directing means.

8. Apparatus for measuring accidental deformation of a vehicle comprising:

a laser source and measuring unit, adapted for placement under the vehicle;

a plurality of coded reflective targets adapted to be positioned with respect to predetermined locations on the vehicle;

computer means including reference data of the normal location, with respect to a reference plane, of said predetermined locations on the vehicle; and a processing program for accepting output from the source and measuring unit representing the deformed position of said points as computed based on reflections from the coded targets and for processing the output and comparing it to the reference data whereby the amount of deformation may be indicated, wherein the laser source and measuring unit includes two laser generators which provide two laser beams, and a rotating hub on which each laser generator is mounted and rotates, whereby each laser beams sweeps an entire 360° arc.

9. The apparatus of claim 8 wherein each coded reflective target comprises at least two reflective areas separated by a non-reflective area, wherein the width of each of the two reflective areas at which the beam sweeps across the surface of the coded target is indicative of a Z coordinate of the target, and the total width of the target is indicative of X,Y coordinates of the target.

10. The apparatus of claim 9 wherein each coded target is rectangular in overall shape having vertical sides defining its width and top and bottom sides defining its height, the reflective areas are positioned to each of the vertical sides respectively, and extend substantially between the top and bottom sides of the target while varying inversely in width over their length between the top and bottom of the target.

11. The apparatus of claim 10 each coded target further including an additional reflective area and an additional non-reflective area, said additional areas extending substantially between the top and bottom sides of the target means, each of said areas being of a predetermined width so that the combination of the additional reflective and non-reflective areas provide a code for uniquely identifying each coded reflective target.

12. Apparatus for indicating deformation of a vehicle body or the like, said vehicle body having at least one reference point and a normal position thereof, said apparatus comprising:

at least one target means including a reflective portion, positioned in a predetermined location relative to the reference point on the vehicle body for indicating deformation of the body by the position of the target means relative to said normal position;

means for sweeping a beam of radiation across the reflective portion of the target means, said reflective portion reflecting said beam;

means for receiving radiation reflected from the target means;

means for interpreting the radiation reflected from the target means and for indicating at least the two-dimensional spatial position of the reference point relative to normal position, further comprising a strut gauge, the strut gauge having, a lower bar, being horizontally disposed in use, and having a longitudinal dimension in a first side and a second side;

a plurality of standing coded targets disposed upon the lower bar, a central target being affixed to the lower bar at substantially the center of the lower bar, a first side target and a second side target being movably affixed to the lower bar, the first side target located on the first side of the lower bar, and the second side target located on the second side of the lower bar;

means for supporting the side targets in an upright position while allowing intermittent sliding motion along the lower bar;

at least two extensible side bars, the side bars being vertically disposed in use and each having a lower end and an upper end;

an upper bar, the upper bar being horizontally disposed in use, the upper bar having a longitudinal dimension divided into a first side and a second side;

at least two pointers disposed on the upper bar, the pointers having a vertical component, the pointers being slidably affixed to the upper bar and adjustable to positions above at least two reference points on the vehicle body whereby the strut gauge is supported in use upon the reference points by the pointer;

longitudinal indexing means for measuring the location of the pointers relative to the upper bar; and corner brackets joining the upper and lower bars to the vertical bars, the corner brackets being located the upper end and lower end of the side bars, thereby forming a rigid parallelogram.

13. The apparatus of claim 12 wherein the longitudinal indexing means comprises:

an optical ruler, the ruler comprising a substantially flat member with a longer longitudinal dimension and a shorter lateral dimension, the member aligned with the upper bar, the member comprising a plurality of longitudinal channels arrayed laterally on the member, the channels having regularly spaced portions alternately opaque and transparent which convey binary information of longitudinal position, each channel coding a bit of a digital representation of the location of the pointer upon the ruler, the total digital representation of location being comprised of the bits of the binary information conveyed by each channel across a particular lateral point;

at least two sensors, each sensor having an emitter comprising a source of electromagnetic radiation the emitter having associated therewith a plurality of optical fibers, at least one fiber per channel, for conveying the radiation to the surface of the ruler above each the channel on the ruler;

a detector comprising a plurality of photo-electrical transducers, the transducers located beneath the ruler to intercept the radiation as the radiation passes through the transparent portion of the ruler, the transducers receiving the radiation and generating an electrical signal upon such reception;

a signal processing unit for receiving the electrical signals in analog form from the transducers, converting the analog signals to digital signals, and storing them for further output; and means for communication between the signal processing unit and the apparatus.

14. The apparatus in claim 13 wherein the means for communication between the signal processing unit and the laser unit comprises an infra-red datalink; and a cable providing electrical connection between the sensor assemblies and the infra-red datalink.

15. A strut gauge for use with an apparatus for indicating deformation of a vehicle body or the like, comprising:

a lower bar, the lower bar being horizontally disposed in use, the lower bar having a longitudinal dimension divided into a first half and a second half;

three standing coded targets disposed upon the lower bar, a first target being affixed to the lower bar at substantially the center of the lower bar, a second and a third target being movably affixed to the lower bar, the second target located on the first half, and the third target located on the second half of the lower bar;

means for supporting the targets in an upright position while allowing intermittent sliding motion along the lower bar;

at least two extensible side bars, the side bars being vertically disposed in use and each having a lower end and an upper end;

an upper bar, the upper bar being horizontally disposed in use, the upper bar having a longitudinal dimension divided into a first half and a second half;

at least two pointers disposed on the upper bar, the pointers having a vertical component, the pointers being slidably affixed to the upper bar, the pointers adjustable to a position directly above at least two reference points whereby upon lowering of the strut gauge upon the reference points the strut gauge is supported upon the reference points by the pointers;

corner brackets, the upper and lower bars joined t the vertical bars through the corner brackets located upon the upper end and lower end of the side bars, thereby forming a rigid parallelogram;

longitudinal indexing means for measuring the location of the pointers relative to the upper bar, the means comprising: an optical ruler, the ruler comprising a substantially flat member with a longer longitudinal dimension and a shorter lateral dimension, the member aligned with the upper bar, the member comprising a plurality of longitudinal channels arrayed laterally on the member, the channels having regularly spaced portions alternately opaque and transparent which convey binary information of longitudinal position, each channel coding a bit of a digital representation of the location of the pointer upon the ruler, the total digital representation of location being comprised of the bits of the binary information conveyed by each channel across a particular lateral point;

at least two sensors, each sensor having an emitter comprising a source of electromagnetic radiation, the emitter having associated therewith a plurality of optical fibers, at least one fiber per channel, for conveying the radiation to the surface of the ruler above each the channel on the ruler;

a detector comprising a plurality of photo-electrical transducer, the transducers located beneath the ruler to intercent the radiation as the radiation passes through the transparent portion of the ruler, the transducers receiving the radiation and generating an electrical signal upon such reception;

a signal processing unit for receiving the electrical signals in analog form from the transducers, converting the analog signals to digital signals, and storing them for further output; and means for communication between the signal processing unit and the apparatus.

16. The apparatus as claimed in claim 15 wherein means for communication between the signal processing unit and the laser unit comprises an infra-red datalink; and a cable providing electrical connection between the sensor assemblies and the infra-red datalink.

17. A method of indicating the deformation of a body comprising the steps of:

attaching at least one reflective target relative to a reference point on the body;

generating and sweeping a beam of radiation in an arc across the target such that the beam sweeps across the target and is reflected therefrom;

receiving the beam as the beam is reflected from the target and indicating the presence or absence of radiation by switching between two states;

counting a number of interval counts over an arc; storing the count in a counter;

calculating at least the two dimensional spatial position of the reference point based on the information stored in the counter, said method further including the steps of attaching plural reflective targets to reference points on the body;

generating and sweeping a beam of radiation in an arc across the targets such that the beam sweeps across the targets and is reflected therefrom;

receiving the beam as the beam is reflected from the targets and indicating the presence or absence of radiation by switching between two switching states;

counting a number of interval counts over an arc;

storing the count at each switch point in a counter; and calculating the spatial position of the reference point associated with each target based on the information stored in the counter, where the spatial position of a reference point associated with a target is comprised of X, Y and Z coordinates and where the X,Y coordinates are calculated by steps comprising determining the number of counts to the center of a target for a pair of laser beams from the start of an arc;

calculating a first angle based on the number of counts to the center of the target of a first laser beam and the total number of counts in an arc;

calculating a second angle based on the number of counts to the center of the target of a second laser beam and the total number of counts in an arc; and calculating the X,Y coordinates of the point using a trigonometric expression involving the first and second angles and a known baseline distance between the origins of the two laser beams.

18. The method of claim 17 where the spatial position of a point associated with a target is comprised of X, Y, and Z coordinates and where the Z coordinate is calculated by the steps of:

determining the number of counts a laser beam takes to cross a first reflective area on a target;

determining the number of counts a laser beam takes to cross a second reflective area on a target;

calculating the ratio of the two counts;

determining the height on the target that the laser beam crosses using this ratio and a total known height of the target, and adding the known distance from the top of the target to the point to which the target is attached to arrive at the Z coordinate.

* * * * *